(12) United States Patent
Sorrentino et al.

(10) Patent No.: US 10,892,929 B2
(45) Date of Patent: Jan. 12, 2021

(54) MULTI-ANTENNA PROCESSING FOR REFERENCE SIGNAL

(71) Applicant: Telefonaktiebolaget LM Ericsson (publ), Stockholm (SE)

(72) Inventors: Stefano Sorrentino, Solna (SE); Sebastian Faxér, Järfälla (SE); Wanlu Sun, San Diego, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/650,642

(22) PCT Filed: Sep. 28, 2018

(86) PCT No.: PCT/SE2018/050998
§ 371 (c)(1),
(2) Date: Mar. 25, 2020

(87) PCT Pub. No.: WO2019/066714
PCT Pub. Date: Apr. 4, 2019

(65) Prior Publication Data
US 2020/0252255 A1 Aug. 6, 2020

Related U.S. Application Data

(60) Provisional application No. 62/566,302, filed on Sep. 29, 2017.

(51) Int. Cl.
*H04L 27/26* (2006.01)
*H04B 7/0456* (2017.01)
(Continued)

(52) U.S. Cl.
CPC ....... *H04L 27/2613* (2013.01); *H04B 7/0456* (2013.01); *H04B 7/068* (2013.01);
(Continued)

(58) Field of Classification Search
CPC .... H04B 7/0456; H04B 7/0473; H04B 7/068; H04L 5/0017; H04L 5/0019
See application file for complete search history.

(56) References Cited

U.S. PATENT DOCUMENTS

2011/0096704 A1   4/2011   Erell et al.
2011/0194551 A1   8/2011   Lee et al.
(Continued)

FOREIGN PATENT DOCUMENTS

CA   2694168 A1   2/2009

OTHER PUBLICATIONS

3rd Generation Partnership Project, "3rd Generation Partnership Project; Technical Specification Group Radio Access Network; Enhanced performance requirement for LTE User Equipment (UE) (Release 11)", Technical Report, 3GPP TR 36.829 V11.1.0, Dec. 1, 2012, pp. 1-114, 3GPP, France.
(Continued)

*Primary Examiner* — Kevin Kim
(74) *Attorney, Agent, or Firm* — Coats & Bennett, PLLC

(57) ABSTRACT

The methods and apparatus disclosed herein processes reference signals in an antenna diversity system, e.g., where both the transmitting and receiving devices use multiple antennas. The solution presented herein process reference signals at the transmitting device in such a way to enable the receiving device to efficiently and accurately estimate the covariance matrix associated with data transmitted using transmitter diversity. This is achieved by processing the reference signals used for the covariance estimation and the data signals in the same way, e.g., by precoding data and reference signal portions of one or more signals using the same coding scheme.

18 Claims, 19 Drawing Sheets

---

APPLYING A SAME CODING SCHEME TO DATA PORTIONS AND REFERENCE SIGNAL PORTIONS OF ONE OR MORE SIGNALS
100

TRANSMITTING THE CODED ONE OR MORE SIGNALS TO THE RECEIVING DEVICE USING MULTIPLE TRANSMITTING ANTENNAS
110

(51) Int. Cl.
*H04B 7/06* (2006.01)
*H04L 1/06* (2006.01)
*H04L 25/03* (2006.01)
*H04L 27/18* (2006.01)

(52) U.S. Cl.
CPC ...... *H04L 1/0618* (2013.01); *H04L 25/03343* (2013.01); *H04L 27/186* (2013.01)

(56) References Cited

U.S. PATENT DOCUMENTS

| | | | |
|---|---|---|---|
| 2012/0014476 A1 | 1/2012 | Kuchi et al. | |
| 2012/0063405 A1* | 3/2012 | Han | H04L 5/006 370/329 |
| 2012/0201207 A1* | 8/2012 | Liu | H04W 24/10 370/329 |
| 2014/0038619 A1 | 2/2014 | Moulsley | |
| 2015/0131758 A1* | 5/2015 | Chen | H04B 1/1027 375/340 |
| 2016/0344459 A1 | 11/2016 | Chen et al. | |

OTHER PUBLICATIONS

3rd Generation Partnership Project, "3rd Generation Partnership Project; Technical Specification Group Radio Access Network; Study on New Radio (NR) Access Technology Physical Layer Aspects (Release 14)", Technical Specification, 3GPP TR 38.802 V1.1.0, Jan. 1, 2017, pp. 1-71, 3GPP, France.

3rd Generation Partnership Project, "3rd Generation Partnership Project; Technical Specification Group Radio Access Network; Evolved Universal Terrestrial Radio Access (E-UTRA); Physical channels and modulation (Release 14)", Technical Specification, 3GPP TS 36.211 V14.1.0, Dec. 1, 2016, pp. 1-175, 3GPP, France.

LG Electronics, "High level view on the study for eV2X", 3GPP TSG RAN WG1 Meeting #86, Gothenburg, Sweden, Aug. 22, 2016, pp. 1-6, R1-166915, 3GPP.

Ericsson, "Antenna pattern at UE/RSU in NR eV2X", 3GPP TSG RAN WG1 Meeting #87, Reno, Nevada, Nov. 14, 2016, pp. 1-3, R1-1612929, 3GPP.

Samsung, "Discussion on vehicular communications for NR", 3GPP TSG RAN WG1 #88, Athens, Greece, Feb. 13, 2017, pp. 1-4, R1-1703021, 3GPP.

Ericsson, "DMRS design for two-port PSSCH transmission", 3GPP TSG RAN WG1 Meeting #92bis, Sanya, China, Apr. 16, 2018, pp. 1-8, R1-1804635, 3GPP.

Ericsson, "Transmit diversity solutions for Rel-15 PSCCH and PSSCH transmissions", 3GPP TSG RAN WG1 Meeting #90bis, Prague, Czech Republic, Oct. 9, 2017, pp. 1-6, R1-1717734, 3GPP.

Qualcomm Incorporated, "Feasibility and gain of PC5 operation with Transmit Diversity", 3GPP TSG-RAN WG1 #88bis, Spokane, USA, Apr. 3, 2017, pp. 1-7, R1-1705002, 3GPP.

Huawei et al., "3GPP V2X Phase 2", 3GPP TSG RAN Meeting #75, Dubrovnik, Croatia, Mar. 6, 2017, pp. 1-5, RP-170798, 3GPP.

Ericsson, "DMRS design for Rel. 15 V2X transmissions with transmit diversity", 3GPP TSG RAN WG1 Meeting #90, Prague, Czech Republic, Aug. 21, 2017, pp. 1-8, R1-1713990, 3GPP.

Ericson, "DMRS design for two-port PSSCH transmission", 3GPP TSG RAN WG1 Meeting #90bis, Prague, Czech Republic, Oct. 9, 2017, pp. 1-7, R1-1717735, 3GPP.

Motorola, "Cubic Metric in 3GPP-LTE", 3GPP TSG RAN WG1 LTE Adhoc, Helsinki, Finland, Jan. 23, 2006, pp. 1-7, Tdoc# R1-060023, 3GPP.

Nokia et al., "Transmit diversity schemes for V2X PC5", 3GPP TSG RAN WG1 Meeting #90bis, Prague, Czech Republic, Oct. 9, 2017, pp. 1-6, R1-1717734, 3GPP.

3rd Generation Partnership Project, "3rd Generation Partnership Project; Technical Specification Group Services and System Aspects; Study on enhancement of 3GPP Support for 5G V2X Services (Release 15)", Technical Report, 3GPP TR 22.886 V15.1.0, Mar. 1, 2017, pp. 1-58, 3GPP, France.

Intel Corporation, "Evaluation of Candidate Transmit Diversity Schemes for LTE V2V Sidelink Communication", 3GPP TSG RAN WG1 Meeting #90, Prague, Czech Republic, Aug. 21, 2017, pp. 1-9, R1-1712485, 3GPP.

* cited by examiner

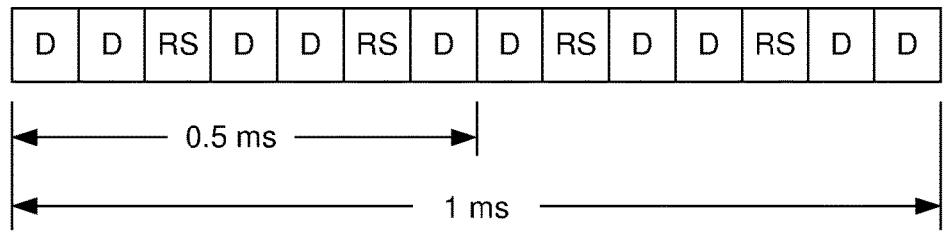
FIGURE 2
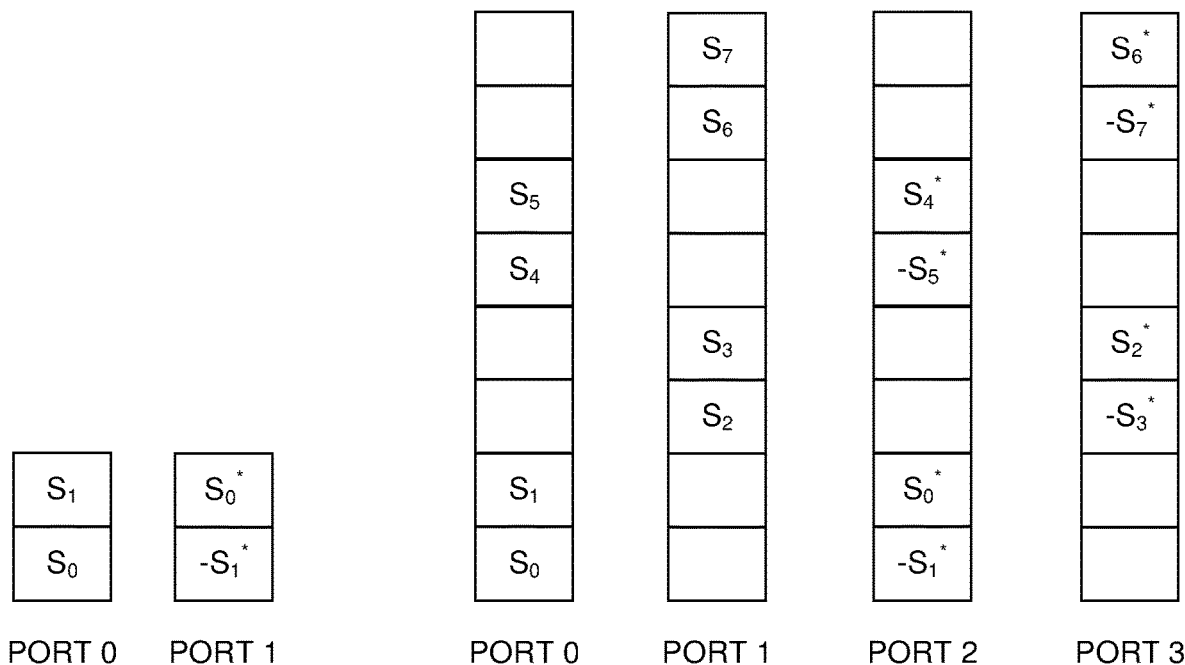
FIGURE 3A  FIGURE 3B

PORT 1: Legacy Rel-14 DMRS sequence: $p_{port1}$

PORT 2: Alamouti SFBC-precoded version of $p_{port1}$: $p_{port2}$

MULTI-ANTENNA PROCESSING FOR REFERENCE SIGNAL

BACKGROUND

During Rel-12, the Long Term Evolution (LTE) standard has been extended with support of device to device (D2D) (specified as "sidelink") features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

In Rel-14, the extensions for the D2D work include support of Vehicle-to-anything-you-can-imagine (V2X) communication, which includes any combination of direct communication between vehicles, pedestrians and infrastructure. V2X communication may take advantage of a Network (NW) infrastructure, when available, but at least basic V2X connectivity should be possible even in case of lack of coverage. Providing an LTE-based V2X interface may be economically advantageous because of the LTE economies of scale and it may enable tighter integration between communications with the Vehicle-to-Infrastructure (V2I), Vehicle-to-Pedestrian (V2P), and Vehicle-to-Vehicle (V2V) communications, as compared to using a dedicated V2X technology. FIG. 1 shows an example network environment implementing V2X, which would be suitable for LTE and/or NR.

V2X communications may carry both non-safety and safety information, where each of the applications and services may be associated with specific requirements sets, e.g., in terms of latency, reliability, capacity, etc.

European Telecommunications Standards Institute (ETSI) has defined two types of messages for road safety: Co-operative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms.

DENM: The DENM message is event-triggered, such as by braking. The availability of a DENM message is also checked for every 100 ms, and the requirement of maximum latency is <=100 ms. The package size of CAM and DENM message varies from 100+ to 800+ bytes, and the typical size is around 300 bytes. The message is supposed to be detected by all vehicles in proximity.

According to the above introduction, we see that safety related V2X communications usually require broadcast manner and high reliability.

V2X communications are based on D2D communications defined as part of ProSe services in Rel-12 and Rel-13. As part of ProSe services, a new D2D interface (designated PC5) is introduced in Rel-14 to support vehicular use cases.

To handle the high Doppler associated with relative speeds of up to 500 km/h and at high frequency (5.9 GHz Intelligent Transport Systems (ITS) band being the main target), in Physical Layer (PHY) design, four reference signal symbols are uniformly located within a 1 ms sub-frame to reduce the time interval between reference signals, as shown in the V2X subframe structure in FIG. 2. Also, the length of a Reference Signal (RS) sequence for each symbol is the scheduled bandwidth for the corresponding transmission expressed as a number of subcarriers.

In LTE V2X Rel-14, only one Transmitter (Tx) antenna is considered. However, in recent discussions of LTE V2X Rel-15 and New Radio (NR) V2X, multi-antenna transmission has become a very promising design aspect due to its potential to enhance reliability and data rate. Also, up to eight antenna elements are considered for V2X antenna configuration in NR studies, where no multi-antenna scheme has yet been specified.

In LTE, Tx diversity has been supported already since Rel-8 for Physical Downlink Shared CHannel (PDSCH) in Transmission Modes 2 & 3 (TM2 & TM3) with Cell-specific Reference Signal (CRS)-based transmission, as well as for transmission of the broadcast and control channels. TM2 uses single layer Tx Diversity scheme based on Space-Frequency Block Code (SFBC), e.g., the Alamouti scheme. If a configuration with two CRS ports is employed at the eNB, SFBC according to FIG. 3A is used where pairs of modulation symbols are mapped to adjacent subcarriers on both antenna ports, but where the symbols are flipped, conjugated, and one of them negated on the second antenna port. If a configuration with four CRS ports is employed at the eNB, SFBC is combined with Frequency-Switched Transmit Diversity (FSTD), as is shown in FIG. 3B. In this example, on each pair of subcarriers, SFBC according to the 2 Tx scheme is performed on a pair of antenna ports.

LTE UEs are equipped with at least two receive antennas, enabling the use of e.g., 2-layer spatial multiplexing. Even if spatial multiplexing is not used and only a single layer is transmitted, which is the case for Tx diversity, multiple receive antennas at the UE still brings a large performance benefit due to receive combining. Typically, the UE would use a linear receiver, applying a $N_{streams} \times N_{RX}$ receive filter $G_{RX}$ to the received $N_{RX} \times 1$ signal vector y in order to estimate the transmitted modulation symbols $\hat{s}=W_{RX}y$, where $N_{RX}$ represents the number of Receiver (Rx) antennas, $N_{streams}$ represents the number of transmitted streams, and $W_{RX}$ represents a matrix of channel weights $w_{RX}$. Common receive filters are designed using linear Minimum Mean Square Error (MMSE) criterion and use either Interference Rejection Combining (IRC) or stream-IRC (S-IRC). The S-IRC receiver is similar to the Maximum Ratio Combining (MRC) receiver in the sense that inter-cell interference is not suppressed; only inter-stream interference is suppressed. The MRC receiver, though, is only applicable to single layer transmission and essentially designs the receive filter by conjugating the channel weights $w_{RX}=h^H$, where $(.)^H$ denotes the conjugate transpose.

Both MMSE receive filters may have the structure $$W_{RX}=\hat{H}^H(\hat{H}\hat{H}^H+\hat{R}_{I+N})^{-1}$$

where $\hat{H}$ represents a channel estimate of the effective channel including precoding and $\hat{R}_{I+N}$ represents an estimated interference and noise covariance matrix. For S-IRC receiver, the noise is assumed to be uncorrelated between the antennas, resulting in $\hat{R}_{I+N}$ being a diagonal matrix, where in some cases $\hat{R}_{I+N}=\sigma^2 I$, assuming equal noise level on all antennas, where $\sigma^2$ represents a power of the white noise and I is an identity matrix. In the S-IRC case, inter-cell interference does not have to be estimated and is not suppressed; only the thermal noise level (and other layers intended for the UE) is accounted for in the receive filter. For IRC receiver, $\hat{R}_{I+N}$ should capture inter-cell interference and the matrix is not constrained to be diagonal.

In order to suppress the inter-cell interference, the second order statistics $R_{I+N}$ are first estimated. This is typically done based on residuals of desired channel estimates. Typically, a channel estimation algorithm works by first acquiring a matrix of "raw" channel estimates $\hat{H}_{raw}$ based on direct estimation of the transmitted reference symbols of the reference signal (e.g. the CRS). In a second step, the raw channel estimations are filtered across frequency and/or time (according to the coherence bandwidth (the statistical measurement of the range of frequencies over which the channel can be considered "flat", i.e., not fluctuate much) and the coherence time of the channel (the time duration over which the channel impulse response is considered to not be varying)) in order to attain a processing gain, which produces a more accurate channel estimate $\hat{H}$. The residuals $\hat{H}_{res} = \hat{H}_{raw} - \hat{H}$ then constitutes an interference sample wherefrom an interference covariance matrix may be estimated.

There currently exist certain challenge(s).

To improve the reliability of V2X broadcast, the aspects of both the transmitter and the receiver are considered herein.

From transmitter point of view, in V2X broadcast systems, the feedback CSI from receivers to the transmitter may not be useful because there are multiple intended receivers and these receivers can experience very different channels. In this case, the transmissions cannot be adapted to time-varying channel conditions by means of beamforming and/or link adaption. Moreover, the feedback CSI from receivers will incur extra delay and increase traffic load of the entire network. Hence, to achieve high reliability for V2X broadcast, open-loop diversity scheme at the transmitter represents a promising solution.

The transmit diversity scheme used for a LTE Downlink (DL) broadcast channel in the case of two antenna ports is based on SFBC, as shown in FIG. 4A. FIG. 4A also indicates how the antenna ports on which a transmit-diversity signal is being transmitted correspond to the CRS signals, more specifically CRS 0 and CRS 1 in the case of two antenna ports.

From a receiver point of view, currently, MRC with multiple Rx antennas is a popular option used in LTE V2X communications, where MRC aims at improving the received signal power without considering any interference situation. However, in V2X communications, the interference resulted from co-channel transmission and In-Band Emission (IBE) is usually inevitable, due to the high traffic load in some scenarios (e.g., urban scenario) and due to the limitation of resource allocation schemes. In these cases, the performance of MRC will degrade due to the lack of interference cancellation/suppression operation.

For enhanced receivers, the MMSE IRC scheme can nicely suppress the interference when the degree of freedom at the receiver is sufficient, i.e., the number of Rx antennas is higher than that of the number of desired data streams. Particularly, RS-based IRC scheme has shown improved performance (see e.g., R1-1717734, "DMRS design for Rel. 15 V2X transmissions with transmit diversity," Ericsson). In this case, the RS is used at the receiver to estimate not only a channel matrix corresponding to the desired signal, but also a covariance matrix of interference signals, where an MMSE IRC receiver uses both. However, if the diversity scheme at the transmitter (e.g., SFBC described above) is directly combined with the IRC receiver, there is a mismatch problem regarding the estimation of the covariance matrix. Specifically, the covariance matrix estimated from RS positions is not the correct one to use when performing MMSE IRC for data transmission. Accordingly, techniques for solving these current problems are needed.

SUMMARY

Certain aspects of the solution presented herein and their embodiments provide solutions to these or other challenges.

The solution presented herein describes a method to process reference signals (RSs) at a transmitting device (Tx or transmitter or "transmit device") with multiple antennas. The solution presented herein proposes to process RSs at the transmitting device in such a way to enable the receiving device (Rx or receiver or "receive device") to efficiently and accurately estimate the covariance matrix associated with data transmitted using a Tx diversity scheme. This is achieved by processing the RSs used for covariance estimation in the same way (e.g., SFBC) as applied to the data processing.

The receiving device performs corresponding steps of estimating the covariance matrix as part of the determination of the demodulator for the data transmission by taking advantage of the knowledge of the processing applied to the RS by the transmitting device. In some embodiments, the processing applied to the RS may be signaled to the receiving device. In other embodiments, the receiving device may be pre-configured with the processing applied to the RSs by the transmitting device.

The solution presented herein results in that the interference covariance matrix estimated from the RSs has a lower rank that better corresponds to the data transmission, leading to enhanced interference suppression capability. Here, data should be interpreted from a generalized perspective, i.e., it includes both user data and control information. Using the processed RSs, a receiving device can combine signals from multiple receive antennas in a way that improves Signal-to-Interference-plus-Noise (SINR) by suppressing interference.

Certain embodiments may provide one or more of the following technical advantages. The solution presented herein allows a receiving device using multiple receive antennas to effectively suppress interference by estimating the correct interference-plus-noise covariance matrix, and thus improves the received SINR. Moreover, unlike some conventional solutions, the solution presented herein does not increase the required number of RS ports at a transmitting device.

One exemplary embodiment comprises a method performed by a transmitting device for precoding one or more signals to be wirelessly transmitted to a receiving device. The transmitting device and the receiving device both use multiple antennas for implementing antenna diversity. The method comprises applying a coding scheme to data portions and to reference signal portions of the one or more signals to generate one or more coded signals. The coding scheme applied to the data portions is the same as the coding scheme applied to the reference signal portions. The method further comprises transmitting the one or more coded signals to the receiving device using multiple transmit antennas of the transmitting device.

In one exemplary embodiment, a transmitting device is configured to precode one or more signals to be wirelessly transmitted to a receiving device. The transmitting device and the receiving device are both configured to use multiple antennas for implementing antenna diversity. The transmitting device comprises one or more processing circuits, multiple transmit antennas, and communication circuitry.

The one or more processing circuits are configured to apply a coding scheme to data portions and to reference signal portions of one or more signals to generate one or more coded signals. The coding scheme applied to the data portions is the same as the coding scheme applied to the reference signal portions. The communication circuitry is configured to transmit the one or more coded signals to the receiving device using the multiple transmit antennas.

One exemplary embodiment comprises a method performed by a receiving device for processing one or more signals received via multiple receive antennas from multiple transmit antennas used by a transmitting device. The method comprises estimating a covariance matrix associated with decoding the received one or more signals, where the estimating is based on an assumption that a coding scheme applied by the transmitting device to data portions of the one or more signals is the same as the coding scheme applied by the transmitting device to reference signal portions of the one or more signals. The method further comprises decoding the received one or more signals using the estimated covariance matrix.

In one exemplary embodiment, a receiving device is configured to process one or more signals. The receiving device comprises multiple receive antennas, communication circuitry, and one or more processing circuits. The communication circuitry is configured to receive, via the multiple receive antennas, one or more signals transmitted by a transmitting device via multiple transmit antennas (940). The one or more processing circuits are configured to estimate a covariance matrix associated with decoding the received one or more signals, where the estimation of the covariance matrix is based on an assumption that a coding scheme applied by the transmitting device to data portions of the one or more signals is the same as the coding scheme applied by the transmitting device to reference signal portions of the one or more signals. The one or more processing circuits are further configured to decode the one or more signals using the estimated covariance matrix.

BRIEF DESCRIPTION OF DRAWINGS

FIG. 2 shows an exemplary V2X subframe structure.

FIGS. 3A-3B show exemplary SFBC for two and four antenna port configurations, respectively.

DETAILED DESCRIPTION

Figure 1:
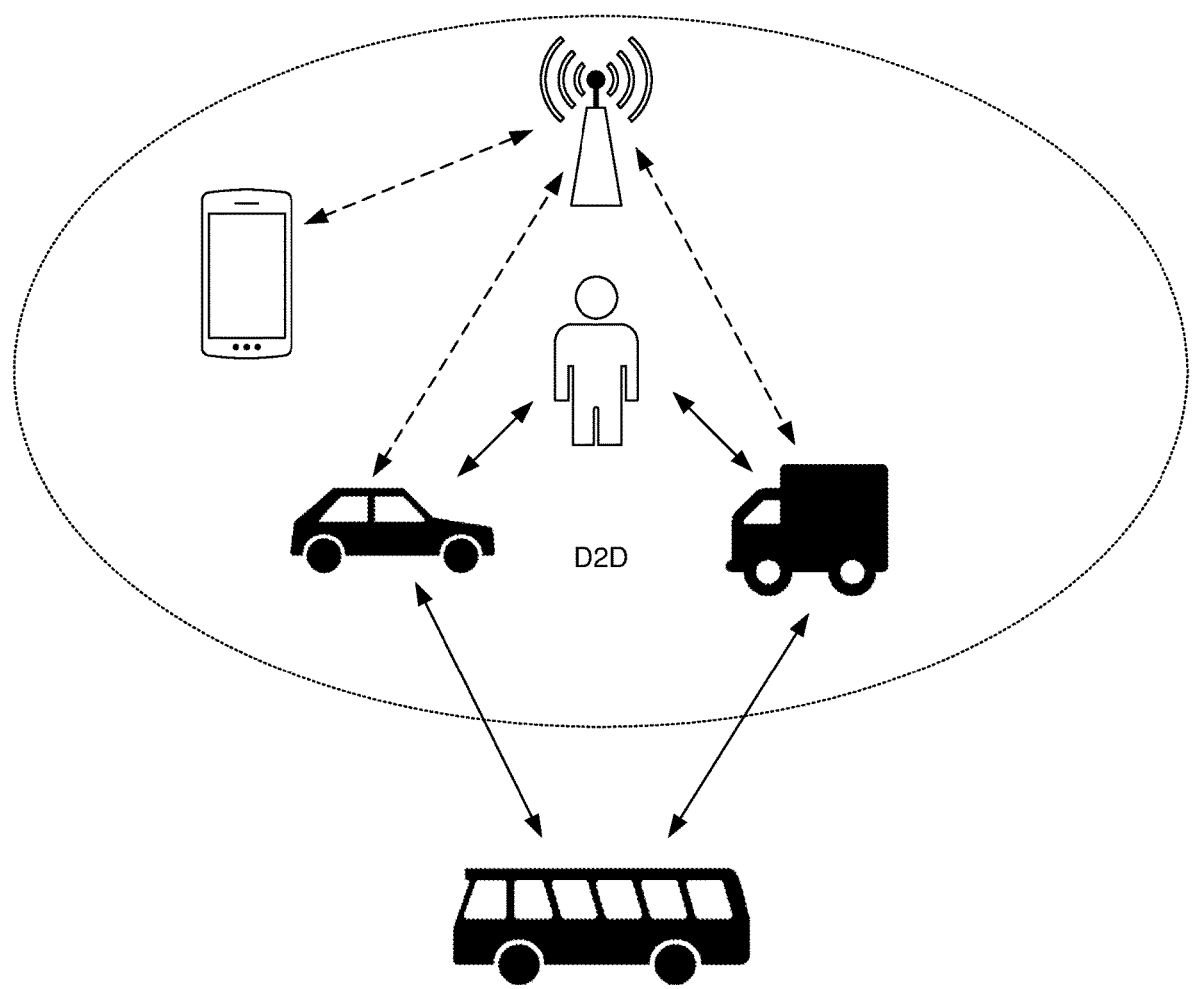
FIG. 1 shows an exemplary network environment for V2X in LTE/NR.
Figure 4A:
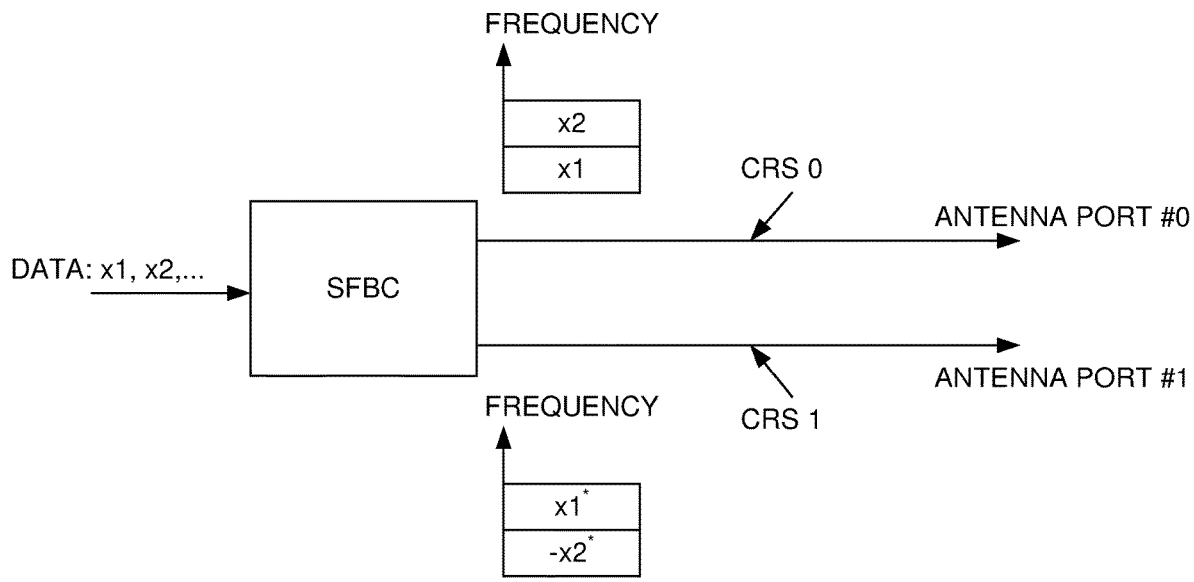
FIGS. 4A and 4B show exemplary transmit diversity schemes for a two antenna port configuration.
Figure 5:
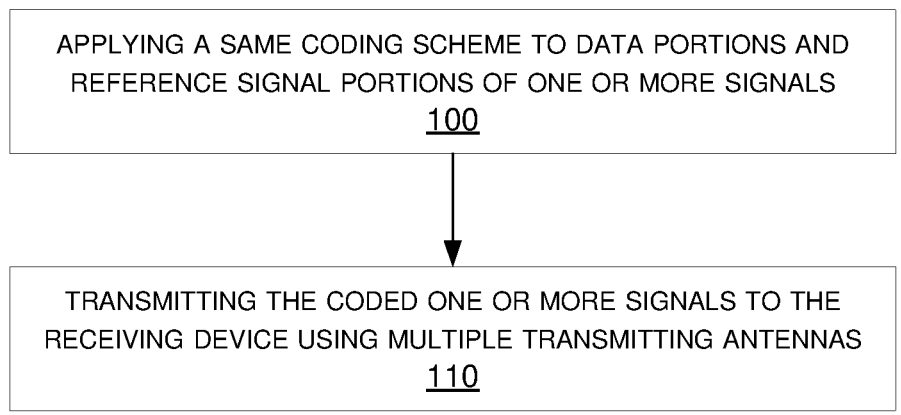
FIG. 5 shows a method of precoding wireless signals according to exemplary embodiments of the solution presented herein.

FIG. 5 shows a method of the solution presented herein in accordance with particular embodiments. The method of FIG. 5 is performed by a transmitting device 900, 1000 (e.g., a network node such as an eNB, base station, network access point, etc., or in some cases, a user equipment (UE)), where the transmitting device 900, 1000 precodes one or more signals to be wirelessly transmitted to a receiving device 700, 800. In an exemplary embodiment, the transmitting device 900, 1000 and the receiving device 700, 800 both implement antenna diversity. The method includes applying a same coding scheme to data portions and reference signal portions of the one or more signals (Block 100). In other words, the coding scheme applied by the transmitting device 900, 1000 to the data portions is the same as the coding scheme applied to the reference signal portions. The method further includes transmitting the coded one or more signals to the receiving device 700, 800 using multiple transmit antennas 940 (Block 110). Though not explicitly shown in FIG. 5, the method may include further aspects. For example, the method may further include:

Embodiments wherein the coding scheme maps different reference signal portions or their conjugates to adjacent subcarriers to be transmitted by different antennas of the multiple transmit antennas, e.g., according to the scheme shown in FIG. 4A, but substituting the data portions x1, x2, . . . shown in this figure with reference signal portions p1, p2, . . . ; and/or In one example, the coding scheme:
maps a first reference signal portion to a first subcarrier of a first RS port and a second reference signal portion to a second subcarrier of the first RS port, where the first and second subcarriers of the first RS port are adjacent subcarriers; and maps a conjugate of the first reference signal portion to a first subcarrier of a second RS port and a negated conjugate of the second reference signal portion to a second subcarrier of the second RS port, where the first and second subcarriers of the second RS port are adjacent subcarriers corresponding to the first and second subcarriers of the first RS port.

Figure 4B:
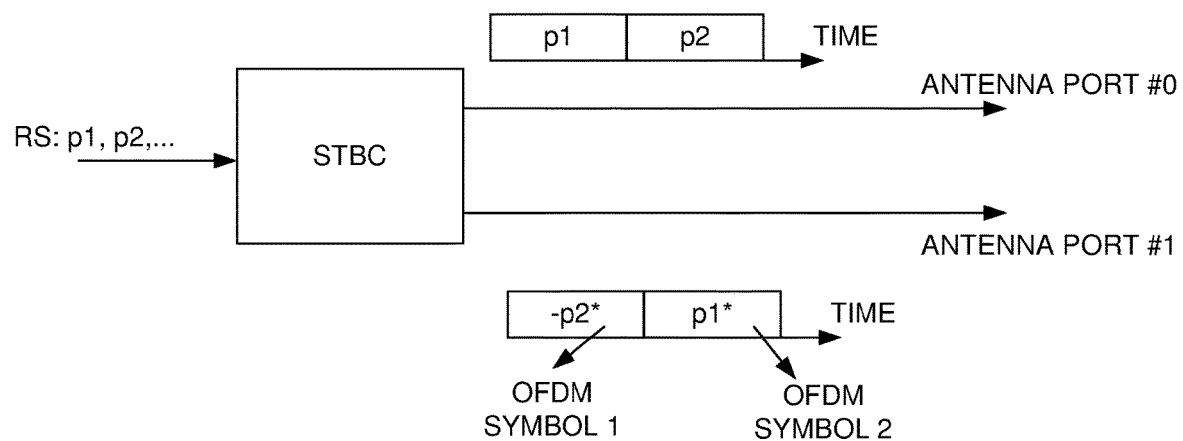

In another example, the coding scheme:

maps a first reference signal portion to a first subcarrier of a first RS port and a negated conjugate of a second reference signal portion to a second subcarrier of the first RS port, where the first and second subcarriers of the first RS port are adjacent subcarriers; and maps a conjugate of the first reference signal portion to a first subcarrier of a second RS port and the second reference signal portion to a second subcarrier of the second RS port, where the first and second subcarriers of the second RS port are adjacent subcarriers corresponding to the first and second subcarriers of the first RS port, Embodiments where the coding scheme is or comprises a space-frequency block coding scheme (SFBC), e.g., an Alamouti SFBC; and/or Embodiments where the coding scheme maps different reference signal portions or their conjugates to adjacent symbols to be transmitted by different antennas of the multiple transmit antennas, e.g., as shown in FIG. 4B, illustrating an STBC scheme mapping different reference signal portions p1, p2, . . . to OFDM symbols and also indicating how the antenna ports on which a transmit-diversity signal is being transmitted correspond to the CRS signals, more specifically CRS 0 and CRS 1 in the case of two antenna ports; and/or in one example, the coding scheme:

maps a first reference signal portion to a first antenna port and a first OFDM symbol and a second reference signal portion to the first antenna port and a second OFDM symbol; and maps a conjugate of the first reference signal portion to a second antenna port and the second OFDM symbol and a negated conjugate of the second reference signal portion to the second antenna port and the first OFDM symbol, where the first and second OFDM symbols are adjacent OFDM symbols.

In another example, the coding scheme:

maps a first reference signal portion to a first antenna port and a first OFDM symbol and a negated conjugate of a second reference signal portion to the first antenna port and a second OFDM symbol; and maps a conjugate of the first reference signal portion to a second antenna port and the second OFDM symbol and the second reference signal portion to the second antenna port and the first OFDM symbol, where the first and second OFDM symbols are adjacent symbols.

Embodiments where the coding scheme is or comprises a space-time block coding (STBC) scheme; and/or Embodiments where the coding scheme maps different reference signal portions or their conjugates to adjacent resource elements on a time-frequency resource grid to be utilized in transmission of the one or more signals using the multiple transmit antennas; and/or Embodiments where the coding scheme implements time division multiplexing; and/or Embodiments where an additional coding operation is applied to the one or more signals after the coding scheme and before transmission of the one or more signals; and/or Embodiments where the additional coding operation is a digital and/or analog beamforming operation; and/or Embodiments where the coding scheme comprises a higher-order diversity coding scheme for three or more transmit antennas, e.g., one coding scheme (e.g., an SFBC scheme) for three or more of the transmit antennas and another coding scheme (e.g., frequency-switched transmit diversity scheme) for the three or more of the transmit antennas, i.e. the higher-order diversity coding scheme may comprise one or more than one higher-order diversity coding scheme for the same three or more of the multiple transmit antennas; and/or Embodiments where the higher-order diversity coding scheme comprises an STBC scheme, SFBC scheme, frequency-switched transmit diversity scheme, a beamforming scheme, and/or a spatial multiplexing scheme; and/or Embodiments where the multiple transmit antennas have multiple polarizations.

These aspects will be explained in further detail below with respect to FIGS. 12 and 13, for example.

Figure 6:
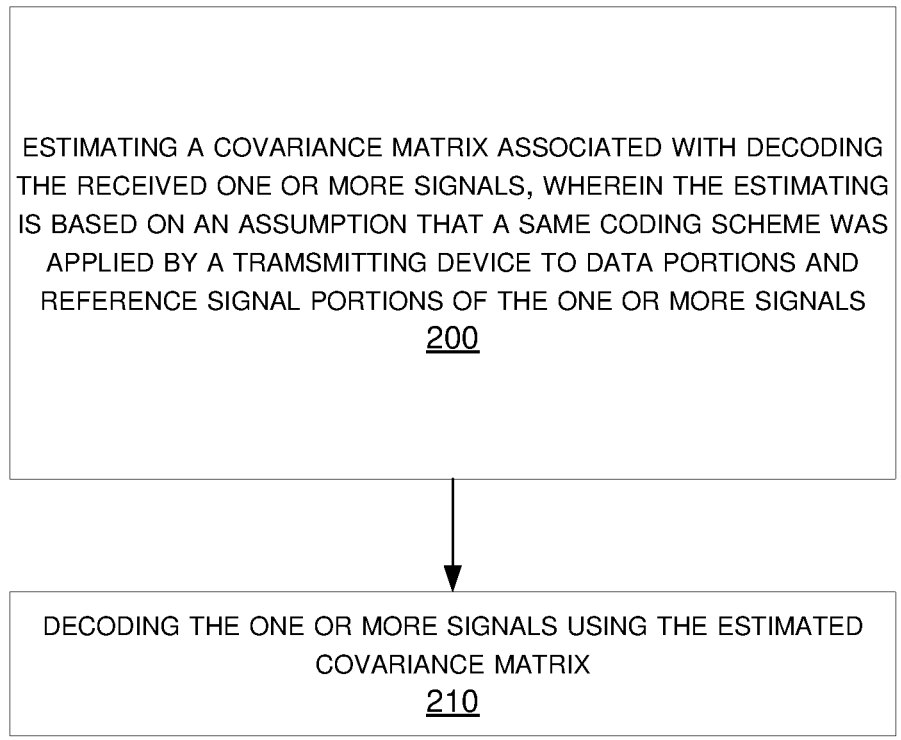
FIG. 6 shows a method of processing received wireless signals precoded according to exemplary embodiments of the solution presented herein.

FIG. 6 shows a method of the solution presented herein in accordance with particular embodiments. The method is performed by a receiving device 700, 800 (e.g., a UE, or in some cases a network node, e.g., an eNB, a base station, a network access point, etc.) for processing one or more signals received via multiple receive antennas 740. The one or more signals may be received from multiple transmit antennas 940 used by a transmitting device 900, 1000. As shown in FIG. 6, the method includes estimating a covariance matrix associated with decoding the received one or more signals, where the estimating is based on an assumption that a same coding scheme was applied by a transmitting device 900, 1000 to data portions and reference signal portions of the one or more signals (Block 200). In other words, the receiving device 700, 800 assumes the coding scheme applied by the transmitting device 900, 1000 to the data portions of the one or more signals is the same as the coding scheme applied to the reference signal portions of the one or more signals. In addition, the method includes decoding the received one or more signals using the estimated covariance matrix (Block 210). The decoding of the received one or more signals may comprise decoding the data portions of the received one or more signals using a channel estimate and the estimated covariance matrix. The decoding of the one or more received signals may further comprise determining the channel estimate based on the reference signal portions of the received one or more signals. Determining the channel estimate may comprise estimating a channel between each of the multiple transmit antennas 940 and each of the multiple receive antennas 740 using the reference signal portions of the received one or more signals. In some examples, the receiving device 700, 800 may be a reference signal minimum mean square error (MMSE) Interference Rejection Combining (IRC) receiver. In some examples, the coding scheme applied by the transmitting device 900, 1000 to both the data portions and the reference signal portions of the one or more signals comprises an SFBC scheme. In some examples, the coding scheme applied by the transmitting device 900, 1000 to both the data portions and the reference signal portions of the one or more signals comprises an STBC scheme. In some examples, the transmitting device 900, 1000 comprises a network node and the receiving device 700, 800 comprises a UE. In some examples, the transmitting device 900, 1000 comprises a UE and the receiving device 700, 800 comprises a network node.

Note that the apparatuses described herein may perform the methods described herein, e.g., the methods of FIGS. 5 and 6, and any other processing by using any functional means, modules, units, or circuitry. In one embodiment, for example, the apparatuses comprise respective circuits or circuitry configured to perform the steps shown in FIGS. 5 and 6. The circuits or circuitry in this regard may comprise circuits dedicated to performing certain functional processing and/or one or more microprocessors in conjunction with memory. For example, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
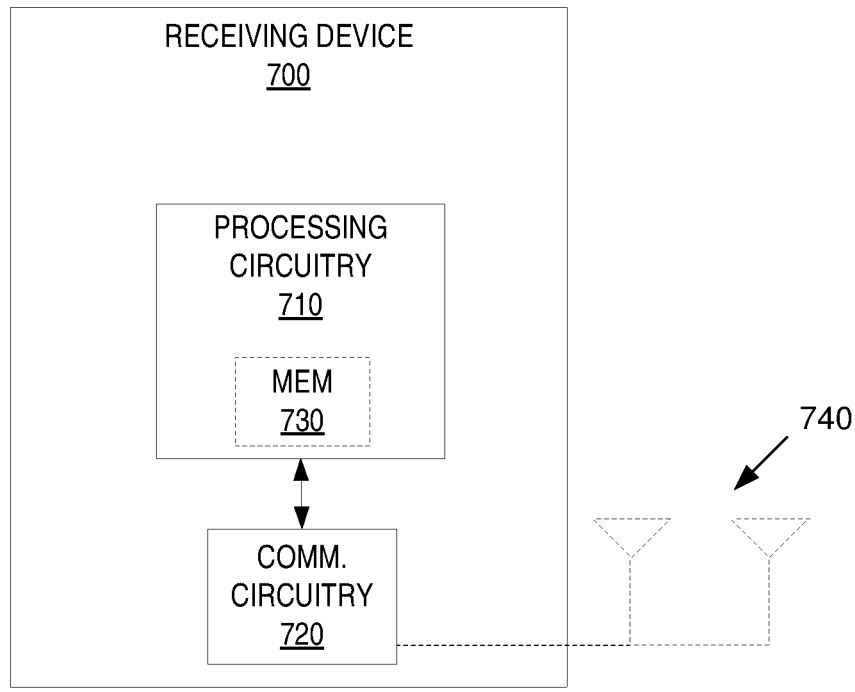
FIG. 7 shows a receiving device according to one exemplary embodiment.

FIG. 7, for example, shows a receiving device 700 as implemented in accordance with one or more embodiments. As shown, the receiving device 700 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas 740 that are either internal or external to the receiving device 700. The processing circuitry 710 is configured to perform the processing described above, such as by executing instructions stored in memory 730. The processing circuitry 710 in this regard may implement certain functional means, units, circuitry, or modules.

Figure 8:
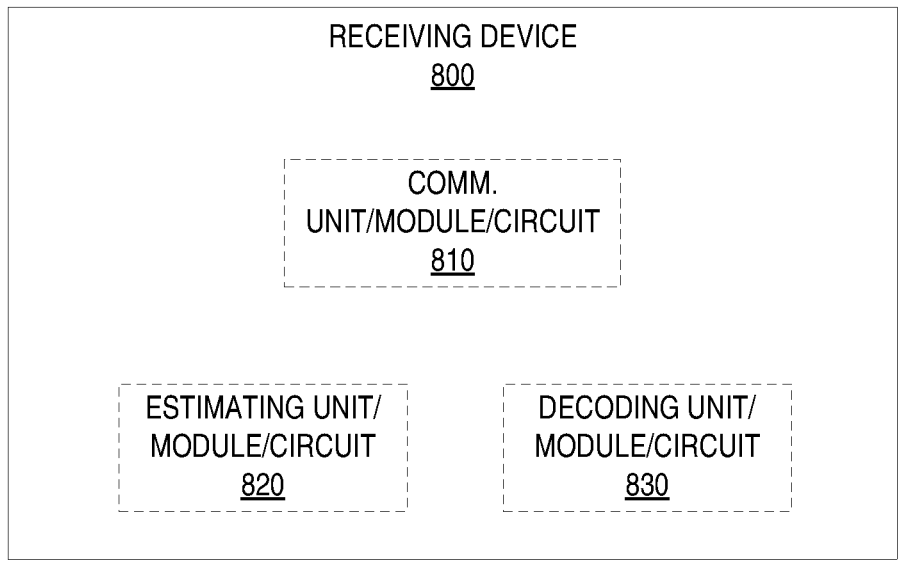
FIG. 8 shows a receiving device according to another exemplary embodiment.

FIG. 8 shows a schematic block diagram of a receiving device 800 in a wireless network (for example, the wireless network shown in FIG. 16) according to still other exemplary embodiments. As shown, the receiving device 800 implements various functional means, units, circuitry, or modules, e.g., via the processing circuitry 710 in FIG. 7 and/or via software code. These functional means, units, circuits, or modules, e.g., for implementing the method(s) disclosed herein, include for example: communication unit/module/circuit 810, estimating unit/module/circuit 820, and decoding unit/module/circuit 830, which are each configured to perform the aspects of the method of FIG. 6. While not explicitly shown, it is assumed communication unit/module/circuit 810 includes the one or more antennas 740 of FIG. 7.

In some examples, a receiving device 700, 800 configured to process one or more signals comprises multiple receive antennas 740, communication circuitry 720, 810, and one or more processing circuits 710, 820, 830. The communication circuitry 720, 810 is configured to receive, via the multiple receive antennas 740, one or more signals transmitted by a transmitting device 900, 1000 via multiple transmit antennas 940. The one or more processing circuits 710, 820, 830 are configured to estimate a covariance matrix associated with decoding the received one or more signals. The estimation of the covariance matrix is based on an assumption that a coding scheme applied by the transmitting device 900, 1000 to data portions of the one or more signals is the same as the coding scheme applied by the transmitting device 900, 1000 to reference signal portions of the one or more signals. The one or more processing circuits 710, 820, 830 are further configured to decode the received one or more signals using the estimated covariance matrix.

In some examples, the receiving device 700, 800 comprises a reference signal minimum mean square error (MMSE) Interference Rejection Combining (IRC) receiver.

In some examples, the one or more processing circuits 710, 820, 830 being configured to decode the received one or more signals comprises the one or more processing circuits 710, 820, 830 being configured to decode the data portions of the received one or more signals using a channel estimate and the estimated covariance matrix. The one or more processing circuits 710, 820, 830 being configured to decode the received one or more signals may further comprise the one or more processing circuits 710, 820, 830 being configured to determine a channel estimate based on the reference signal portions of the received one or more signals.

In some examples, the one or more processing circuits 710, 820, 830 are configured to determine the channel estimate by being further configured to estimate a channel between each of the multiple transmit antennas 940 and each of the multiple receive antennas 740 using the reference signal portions of the received one or more signals.

In some examples, the coding scheme applied by the transmitting device 900, 1000 to both the data portions and the reference signal portions of the received one or more signals comprises a Space-Frequency Block Coding (SFBC) scheme. In some examples, the coding scheme applied by the transmitting device 900, 1000 to both the data portions and the reference signal portions of the received one or more signals comprises a Space-Time Block Coding (STBC) scheme.

In some examples, the transmitting device 900, 1000 comprises a network node and the receiving device 700, 800 comprises a user equipment. In some examples, the transmitting device 900, 1000 comprises a user equipment and the receiving device 700, 800 comprises a network node.

Figure 9:
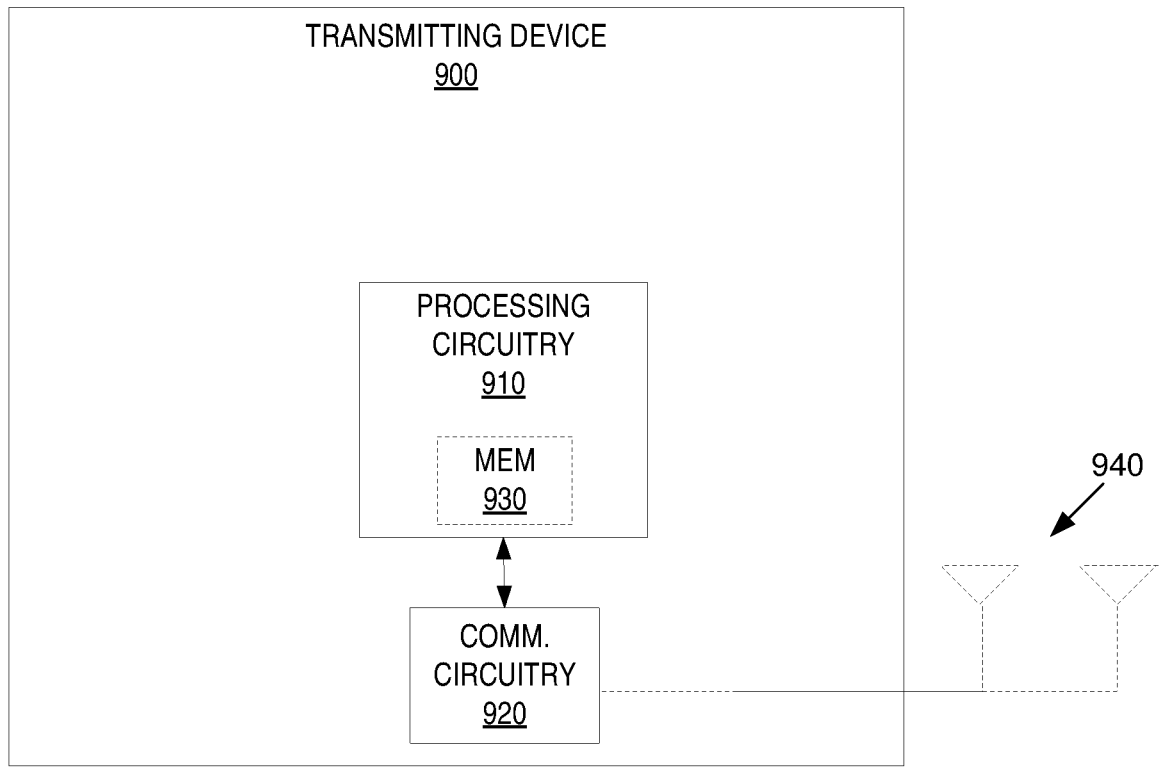
FIG. 9 shows a transmitting device according to one exemplary embodiment.

FIG. 9 shows a transmitting device 900 as implemented in accordance with one or more embodiments. As shown, the transmitting device 900 includes processing circuitry 910 and communication circuitry 920. The communication circuitry 920 is configured to transmit and/or receive information to and/or from one or more other nodes, e.g., via any communication technology. Such communication may occur via one or more antennas 940 that are either internal or external to the transmitting device 900. The processing circuitry 910 is configured to perform processing described above, such as by executing instructions stored in memory 930. The processing circuitry 910 in this regard may implement certain functional means, units, circuitry, or modules.

Figure 10:
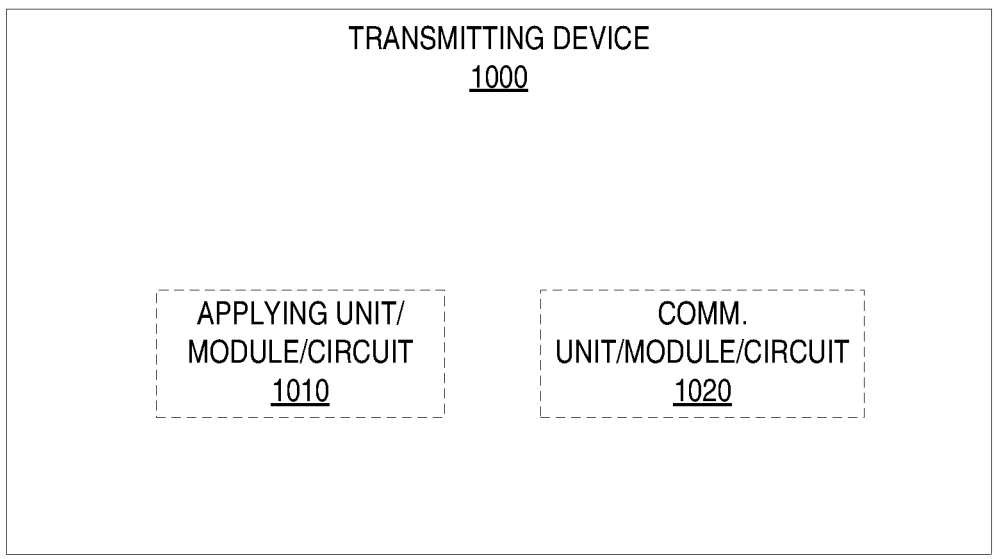
FIG. 10 shows a transmitting device according to another exemplary embodiment.

FIG. 10 shows a schematic block diagram of a transmitting device 1000 in a wireless network (for example, the wireless network shown in FIG. 16) according to still other embodiments. As shown, the transmitting device 1000 implements various functional means, units, circuitry, or modules, e.g., via the processing circuitry 910 in FIG. 9 and/or via software code. These functional means, units, circuits, or modules, e.g., for implementing the method(s) herein, include for example: applying unit/module/circuit 1010 and communication unit/module/circuit 1020, which are each configured to perform the aspects of the method of FIG. 5. While not explicitly shown, it is assumed communication unit/module/circuit 1020 includes the one or more antennas 940 of FIG. 9.

In some examples, a transmitting device 900, 1000 is configured to precode one or more signals to be wirelessly transmitted to a receiving device 700, 800, where the transmitting device 900, 1000 and the receiving device 700, 800 are both configured to use multiple antennas 740, 940 for implementing antenna diversity. The transmitting device 900, 1000 comprises one or more processing circuits 910, 1010, multiple transmit antennas 940, and communication circuitry 920, 1020. The one or more processing circuits 910, 1010 are configured to apply a coding scheme to data portions and to reference signal portions of one or more signals to generate one or more coded signals, wherein the coding scheme applied to the data portions is the same as the coding scheme applied to the reference signal portions. The communication circuitry 920, 1020 is configured to transmit the one or more coded signals to the receiving device 700, 800 using the multiple transmit antennas 940.

In some examples, the transmitting device 900, 1000 is configured to apply a coding scheme maps different reference signal portions or their conjugates to adjacent subcarriers to be transmitted by different antennas of the multiple transmit antennas 940. In some examples, the coding scheme comprises a Space-Frequency Block Coding (SFBC) scheme. In some examples, the coding scheme maps different reference signal portions or their conjugates to adjacent Orthogonal Frequency Division Multiplex (OFDM) symbols to be transmitted by different antennas of the multiple transmit antennas 940. In some examples, the coding scheme comprises a Space-Time Block Coding (STBC) scheme. In some examples, the coding scheme maps different reference signal portions or their conjugates to adjacent resource elements on a time-frequency resource grid to be utilized in transmission of the one or more signals using the multiple transmit antennas 940.

In some examples, the coding scheme comprises a higher-order diversity coding scheme comprising a first coding scheme for three or more of the multiple transmit antennas 940 and a second coding scheme for the three or more of the multiple transmit antennas 940. In some examples, the first and second coding schemes comprise an STBC scheme and/or an SFBC scheme and/or a frequency-switched transmit diversity scheme and/or a beamforming scheme and/or a spatial multiplexing scheme.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

The solution presented herein is described in the context of V2X communications. However, most of the embodiments also apply to scenarios that require high reliability and use Tx diversity schemes for the desired transmission.

To improve the reliability of V2X broadcast, two aspects are considered. First, to combat channel fading, open-loop Tx diversity (e.g., Alamouti SFBC) is a promising enabler. Second, interference from other transmitters is also a crucial aspect that may deteriorate system performance, due to the potentially high traffic load (e.g., in urban scenarios) and the limitation of resource allocation schemes. Hence, a receiving device should take interference into account for better decoding performance. For this purpose, an IRC receiver has been widely used in general wireless communication systems, where RS-based MMSE IRC scheme has shown promising results. However, as stated above, there is a mismatch problem when combining some diversity methods at Tx and RS-based MMSE IRC at Rx. To be more precise, although Tx Diversity schemes such as SFBC constitute a single-layer transmission from data transmission rank perspective, the associated transmission covariance matrix is rank-2, rather than rank-1, when jointly taking into account the REs used for transmission. This is because the energy is spread over multiple directions. When the Tx Diversity scheme is generating interference, the associated rank-2 matrix is penalizing the performance of an MMSE IRC.

Figure 11:
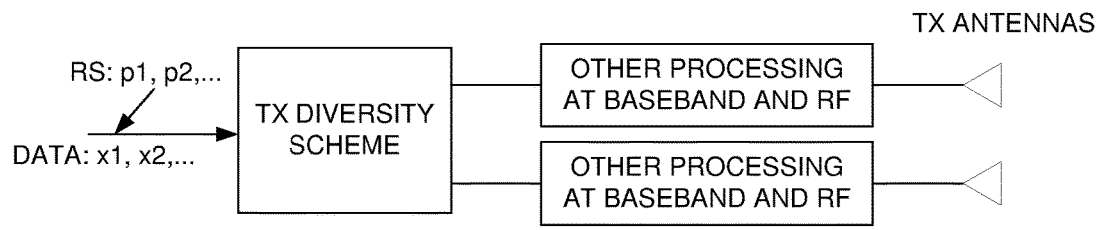
FIG. 11 shows a block diagram of the solution presented herein as implemented by a transmitting device according to one exemplary embodiment.

FIG. 11 generally shows the solution presented herein, which includes extending the dimension of the estimated covariance matrix to include all the Resource Elements (REs) that are spanned by a codeblock, e.g., four REs for Alamouti SFBC. By doing this, instead of having a rank-2 2×2 covariance matrix obtained by averaging the covariance estimation over the two frequency resources, a rank-1 matrix that spans a mixture of space-frequency REs is obtained. The discussion below also describes how the receiving device can use the obtained covariance matrix to derive the MMSE IRC receiver for SFBC, e.g., via an algorithm or via Equation (2) below. Additionally, examples of how the transmitting device and receiving device can encode and exploit DMRS in order to enable efficient derivation of the MMSE IRC receiver, e.g., an accurate derivation without extra complexity, are provided, including the step of estimating the low-rank covariance matrix, e.g., a covariance matrix whose rank is lower than its dimension.

The solution presented herein is described in terms of rate-1 a SFBC, but the embodiments are readily applicable to any spatial block code, e.g., STBC, by swapping the time/frequency dimensions and properly choosing the vectors/matrix dimensions.

RS Generation and Processing at Tx

Figure 12:
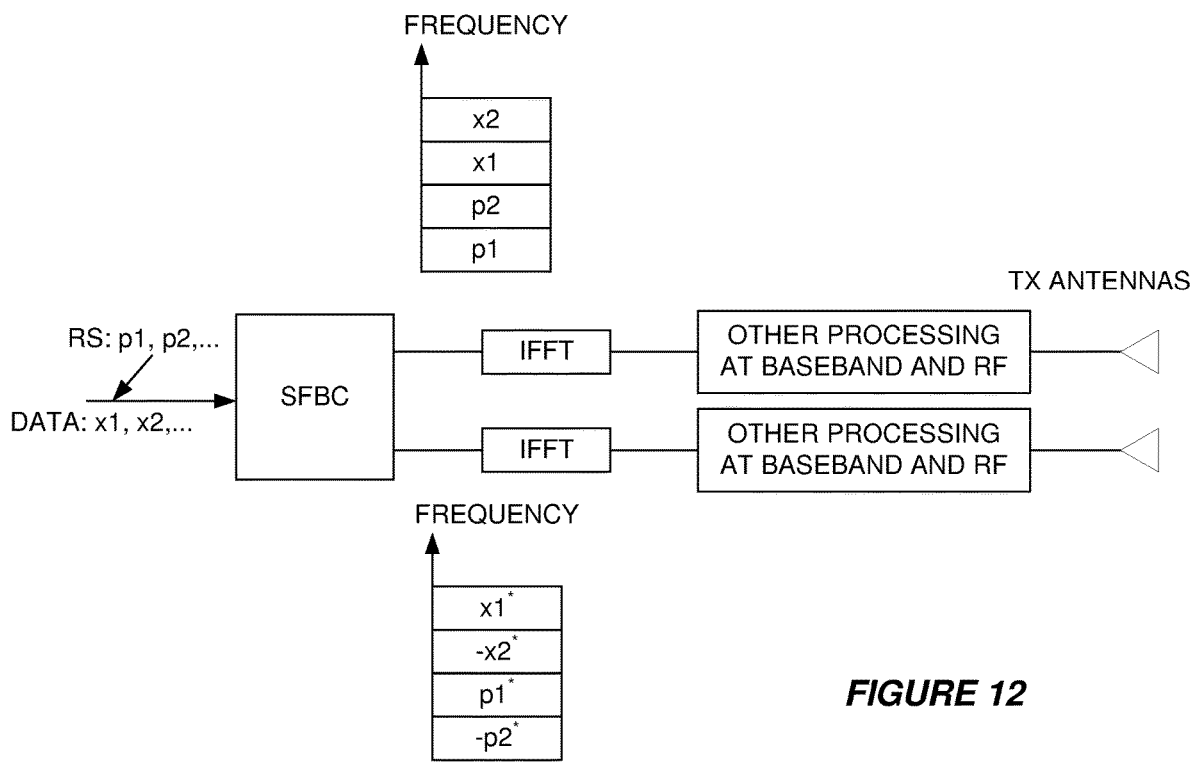
FIG. 12 shows a block diagram of the solution presented herein as implemented by a transmitting device according to another exemplary embodiment.
Figure 13:
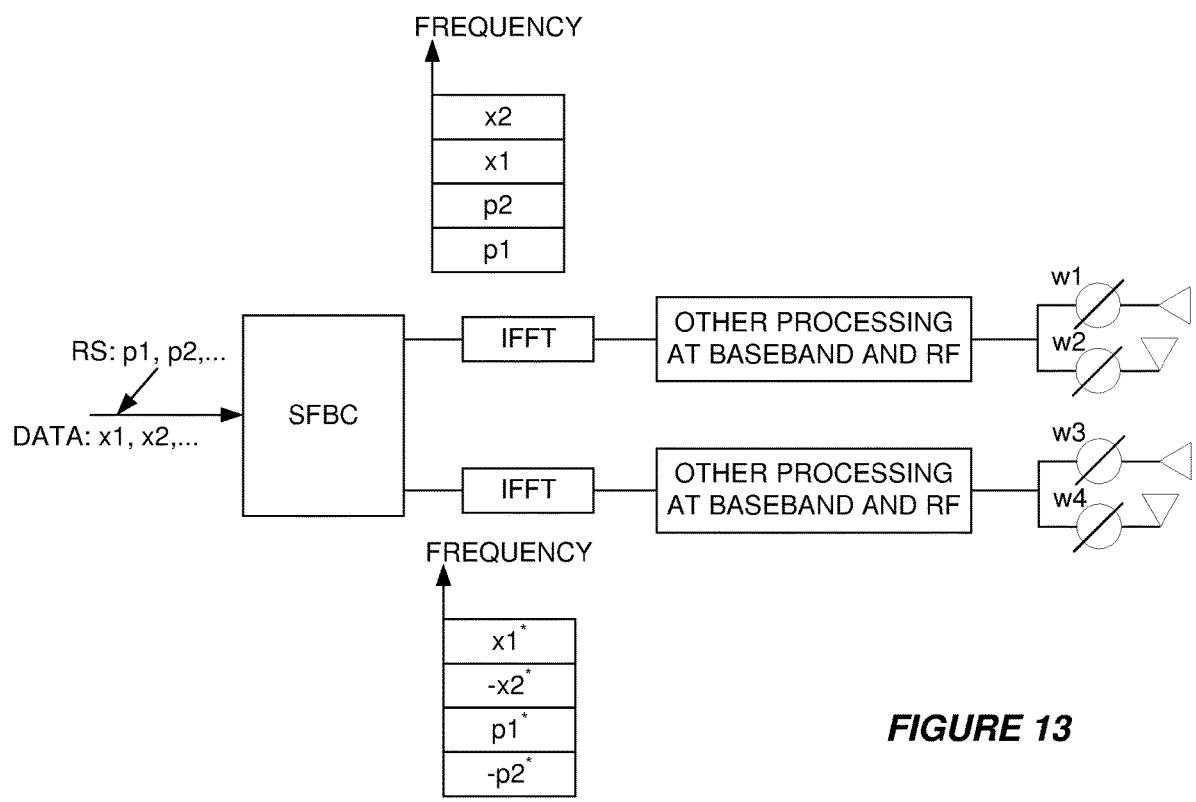
FIG. 13 shows a block diagram of the solution presented herein as implemented by a transmitting device according to another exemplary embodiment.

A first embodiment considers Alamouti SFBC as the Tx diversity scheme, where FIG. 12 shows an example. As shown in FIG. 12, the RS is inserted before SFBC, which is different from the current SFBC-OFDM system used in LTE. Also, the exemplary solution of FIG. 12 does not require an increased number of RS ports. In this example, the coding scheme, e.g., SFBC, maps RS portions p1 and p2 to the two adjacent subcarriers of the first RS port, and conjugates $-p2^*$ and $p1^*$ of the reference signal portions to the corresponding two adjacent subcarriers of the second RS port, where $Q^*$ denotes conjugate.

In another example, SFBC maps p1 and $-p2^*$ to the two adjacent subcarriers of the first RS port, and p2 and $p1^*$ to the corresponding two adjacent subcarriers of the second RS port, as shown in FIG. 4A.

In some embodiments, space-time block coding, e.g., Alamouti STBC, is used as the Tx diversity scheme. In this case, the modulation symbols are mapped to adjacent OFDM symbols rather than adjacent subcarriers, as shown in FIG. 4B. Here OFDM symbols are used as an example, but the teachings herein are equally applicable in systems where other types of symbols are used for transmission. In a more general case, a combination of space and frequency block codes may be used, so that modulation symbols may be mapped onto adjacent REs on the time-frequency resource grid.

In some embodiments, data and RS are multiplexed in a Time Division Multiplexing (TDM) manner instead of a Frequency Division Multiplexing (FDM) manner.

In some embodiments, additional precoding operations, such as applying a beamformer (which can be digital precoding or hybrid analogue/digital precoding) are applied after SFBC processing.

In some embodiments, dual polarized antennas are applied. An example is shown in FIG. 13, where antennas have two different polarizations. Also, hybrid precoding is considered in the example, where w1, w2, w3, w4 denote the precoding weights of the four transmit antennas, respectively.

In some embodiments, the transmitting device has more than two antennas and more than two digital chains. In these exemplary embodiments, the solution presented herein can still be applied. The alternatives include higher order diversity scheme (i.e., diversity order is larger than two) by use of other STBC/SFBC schemes, the combination of frequency switched transmit diversity (FSTD) and SFBC, and the combination of diversity with beamforming or spatial multiplexing.

RS-Based MMSE IRC Processing at Rx

Figure 14:
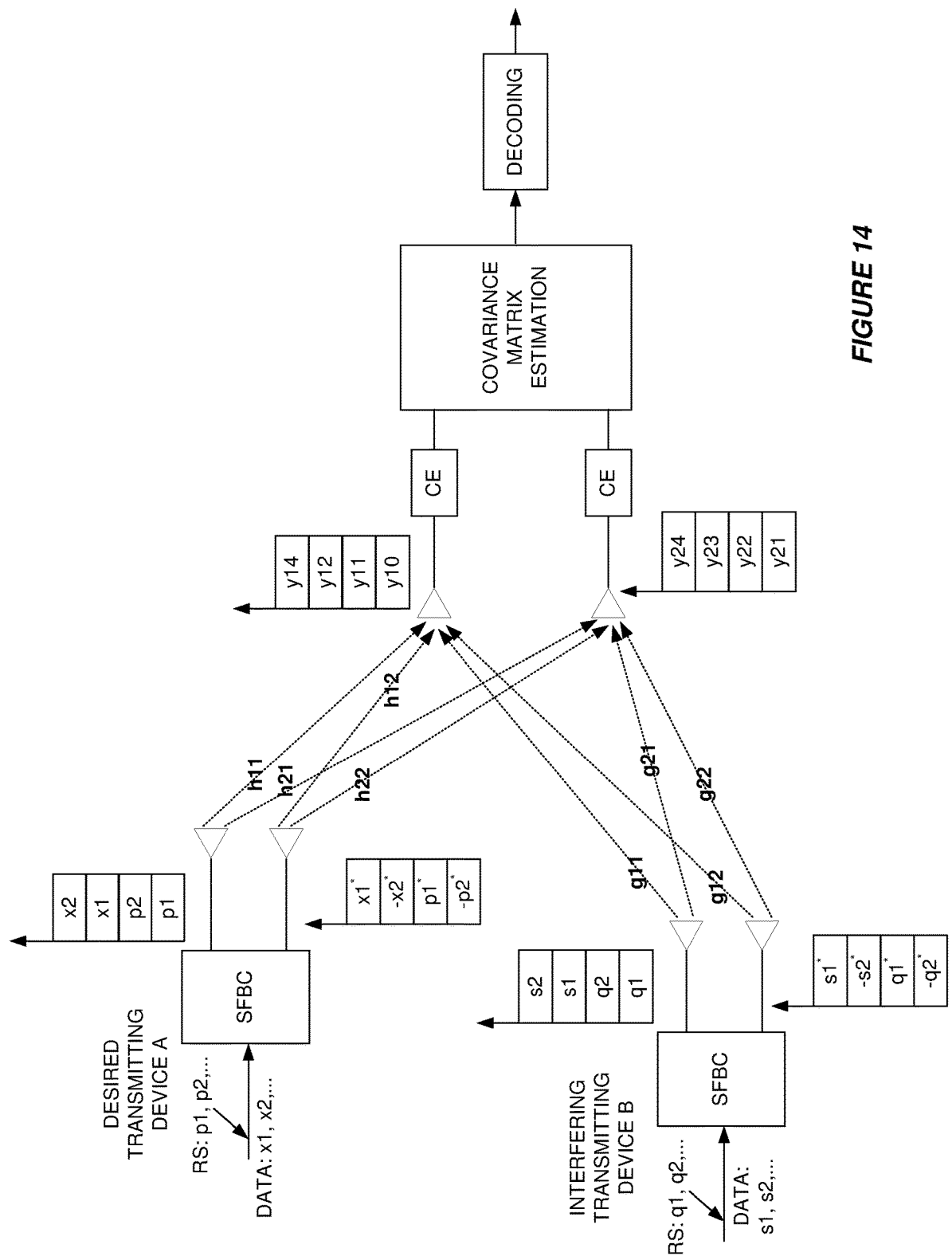
FIG. 14 shows a block diagram of the solution presented herein as implemented by transmitting and receiving devices according to another exemplary embodiment.

FIG. 14 shows an exemplary embodiment of an RS-based MMSE IRC receiver for SFBC-OFDM system, where the transmitting device is also included for completeness. Note that FIG. 14 only shows the operations before IFFT at the transmitting device and after FFT at the receiving device.

As shown in FIG. 14, transmitting device A is the desired transmitting device and transmitting device B is the co-channel interference source. In this way, the received signal at the two considered RS positions at the receiving device can be expressed as:

$$\underbrace{\begin{bmatrix} y11 \\ y21 \\ y12^* \\ y22^* \end{bmatrix}}_{\triangleq y} = \underbrace{\begin{bmatrix} h11 & -h12 \\ h21 & -h22 \\ h12^* & h11^* \\ h22^* & h21^* \end{bmatrix}}_{\triangleq H} \underbrace{\begin{bmatrix} p1 \\ p2^* \end{bmatrix}}_{\triangleq p} + \underbrace{\begin{bmatrix} g11 & -g12 \\ g21 & -g22 \\ g12^* & g11^* \\ g22^* & g21^* \end{bmatrix}}_{\triangleq G} \underbrace{\begin{bmatrix} q1 \\ q2^* \end{bmatrix}}_{\triangleq q} + \underbrace{\begin{bmatrix} n11 \\ n21 \\ n12^* \\ n22^* \end{bmatrix}}_{noise}, \quad (1)$$

desired signal     interference where y represents the received signal. To implement an MMSE IRC receiver, the receiver weight matrix may be given as:

$$W_{RX,IRC} = H^H (HH^H + R_{I+N})^{-1}, \quad (2)$$

where $R_{I+N} \triangleq R_I + \sigma^2 I = GG^H + \sigma^2 I$ represents the covariance matrix of interference plus noise and $R_I \triangleq GG^H$ represents the covariance matrix of interference. Note that the 4×4 matrix $R_I$ has rank 2, which provides enough degrees of freedom at the receiving device to both decode the desired data from transmitting device A and to suppress interference from transmitting device B.

In an RS-based MMSE IRC receiver, both H and $R_{I+N}$ are estimated from the RS. More specifically, Equation (1) shows that the desired channel H, which includes four unknown variables, can be estimated using the received signal y and the known RS p using, e.g., least squares estimation. An example to obtain the estimated channel may be given by:

$$\begin{bmatrix} \hat{h}11 \\ \hat{h}21 \\ \hat{h}12 \\ \hat{h}22 \end{bmatrix} = \begin{bmatrix} \frac{p1^* y11 + p2^* y12}{|p1|^2 + |p2|^2} \\ \frac{p1^* y21 + p2^* y22}{|p1|^2 + |p2|^2} \\ \frac{p1 y12 - p2 y11}{|p1|^2 + |p2|^2} \\ \frac{p1 y21 - p2 y21}{|p1|^2 + |p2|^2} \end{bmatrix}. \quad (3)$$

In this way, the estimated channel matrix $\hat{H}$ is given by:

$$\hat{H} = \begin{bmatrix} \hat{h}11 & -\hat{h}12 \\ \hat{h}21 & -\hat{h}22 \\ \hat{h}12^* & \hat{h}11^* \\ \hat{h}22^* & \hat{h}21^* \end{bmatrix}. \quad (4)$$

Note that the expression in Equation (3) is just an example of channel estimation methods, which can be further filtered across frequency and/or time (according to the coherence bandwidth and coherence time of the channel) in order to attain a processing gain and produce a more accurate estimated channel matrix $\hat{H}$. As used herein, the coherence bandwidth is a statistical measurement of the range of frequencies over which the channel can be considered "flat" (i.e., not fluctuate much), while the coherence time is the time duration over which the channel impulse response is considered to not be varying.

Moreover, the covariance matrix of interference plus noise $R_{I+N}$ can be estimated as:

$$\hat{R}_{I+N} = E\{\tilde{y}\tilde{y}^H\} = E\{(y - \hat{H}p)(y - \hat{H}p)^H\}, \quad (5)$$

where $E\{.\}$ represents the expectation, i.e., the average, over all RS positions that experience the same or similar covariance matrix of interference plus noise, and $$\tilde{y} = y - \hat{H}p \quad (6)$$

represents the estimated interference plus noise at the receiving device.

Note that for easier explanation, Equation (1) only considers two adjacent RS positions at the receiving device. In fact, the same idea can be applied to all RS positons. Then y in Equation (6) can be calculated correspondingly for different RS positions and different RS sequences. In this way, a set of ŷ values can contribute to the calculation of the expectation in Equation (5) as long as these RS positions experience the same or similar interference channel G.

Finally, the decoding step in FIG. 14 is implemented as:

$$\hat{x} = \hat{H}^H (\hat{H}\hat{H}^H + \hat{R}_{I+N})^{-1} y, \quad (7)$$

where x̂ represents the decoded symbol on the considered resource elements (REs), Ĥ and $\hat{R}_{I+N}$ are obtained from Equation (4) and Equation (5) respectively, and y is the received signal vector on the considered RE. Equation (7) is considered to be a better SFBC decoder than a conventional one because it exploits the spatial signature of the interference in detail, rather than averaging over multiple REs.

The example in FIG. 14 and the analysis above demonstrate the important advantage of the solution presented herein. Indeed, by applying SFBC also to the RS, it can be assumed that the covariance matrices of interference plus noise (i.e., $R_{I+N}$ in Equation (2)) are the same for the data transmission (i.e., x1 and x2) and the RS transmission (i.e., p1 and p2). This solves the mismatch problem discussed herein. For example, if SFBC does not apply to the RS, as in conventional solutions, there are two options of mapping RSs to REs. In the first option, the two RS ports are orthogonal in frequency at the transmitting device. In this case, there are some elements in the covariance matrix of data transmission that cannot be estimated from RS transmission. In the second option, the two RS ports at a transmitting device are multiplexed in a Code Division Multiplexing (CDM) manner but without going through SFBC processing. In this case, $R_{I+N}$ estimated from RS transmission is based on two-layer interference, while the actual $R_{I+N}$ of data transmission is from one-layer interference. The solution presented herein solves the problems of these two options.

In some other embodiments, the interfering transmitting devices use other Tx diversity schemes, e.g., CDD, precoding cycling, etc. In these cases, the processing at the receiving device is the same with the example shown in FIG. 14, and the Equations (3)-(7) are still applicable.

In some embodiments, the receiving device has more than two antennas and there is more than one interference source. In these cases, the solution presented herein is still applicable. The rule of thumb of effectively suppressing interference is that the degree of freedom at the receiving device is no less than the number of desired transmission layer plus the number of interference transmission layer after taking into account the diversity scheme. When employing Alamouti SFBC diversity scheme, the transmission layer is one instead on two, even though two RS ports are applied.

In some embodiments, the number of receive antennas is larger than the number of receiver digital chains, i.e., hybrid combining is applied at the receiving device. The solution presented herein is applicable to this case, where the number of receiver digital chains is counted as the degree of freedom.

In some embodiments, the receive antennas have different polarizations.

Figure 16:
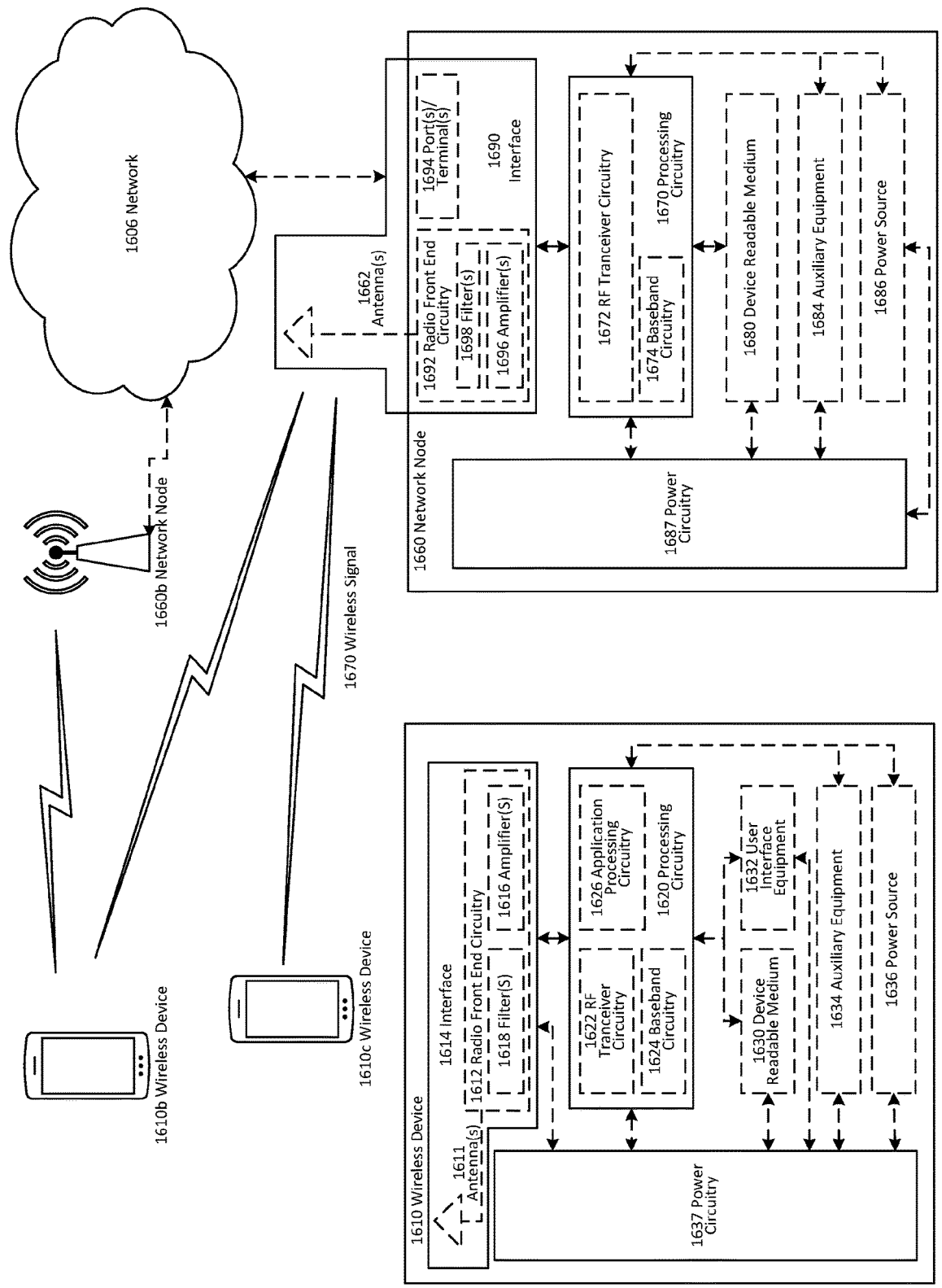
FIG. 16 shows an exemplary wireless network applicable to the solution presented herein.

Although the subject matter described herein may be implemented in any appropriate type of system using any suitable components, the embodiments disclosed herein are described in relation to a wireless network, such as the example wireless network shown in FIG. 16. For simplicity, the wireless network of FIG. 16 only depicts network 1606, network nodes 1660 and 1660b, and WDs 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device (WD) 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and WD 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1660 includes processing circuitry 1670, device readable medium 1680, interface 1690, auxiliary equipment 1684, power source 1686, power circuitry 1687, and antenna 1662. Although network node 1660 shown in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or WDs 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or WDs via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 16 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. WD 1610 may include multiple sets of one or more of the illustrated components for different wireless technologies supported by WD 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1610.

Antenna 1611 may include one or more antennas or antenna arrays, configured to send and/or receive wireless signals, and is connected to interface 1614. In certain alternative embodiments, antenna 1611 may be separate from WD 1610 and be connectable to WD 1610 through an interface or port. Antenna 1611, interface 1614, and/or processing circuitry 1620 may be configured to perform any receiving or transmitting operations described herein as being performed by a WD. Any information, data and/or signals may be received from a network node and/or another WD. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, WD 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or WDs via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1610 components, such as device readable medium 1630, WD 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of WD 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a WD may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of WD 1610, but are enjoyed by WD 1610 as a whole, and/or by end users and the wireless network generally.

Processing circuitry 1620 may be configured to perform any determining, calculating, or similar operations (e.g., certain obtaining operations) described herein as being performed by a WD. These operations, as performed by processing circuitry 1620, may include processing information obtained by processing circuitry 1620 by, for example, converting the obtained information into other information, comparing the obtained information or converted information to information stored by WD 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with WD 1610. Such interaction may be of many forms, such as visual, audial, tactile, etc. User interface equipment 1632 may be operable to produce output to the user and to allow the user to provide input to WD 1610. The type of interaction may vary depending on the type of user interface equipment 1632 installed in WD 1610. For example, if WD 1610 is a smart phone, the interaction may be via a touch screen; if WD 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into WD 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from WD 1610, and to allow processing circuitry 1620 to output information from WD 1610. User interface equipment 1632 may include, for example, a speaker, a display, vibrating circuitry, a USB port, a headphone interface, or other output circuitry. Using one or more input and output interfaces, devices, and circuits, of user interface equipment 1632, WD 1610 may communicate with end users and/or the wireless network, and allow them to benefit from the functionality described herein.

Auxiliary equipment 1634 is operable to provide more specific functionality which may not be generally performed by WDs. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. WD 1610 may further comprise power circuitry 1637 for delivering power from power source 1636 to the various parts of WD 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case WD 1610 may be connectable to the external power source (such as an electricity outlet) via input circuitry or an interface such as an electrical power cable. Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of WD 1610 to which power is supplied.

Figure 17:
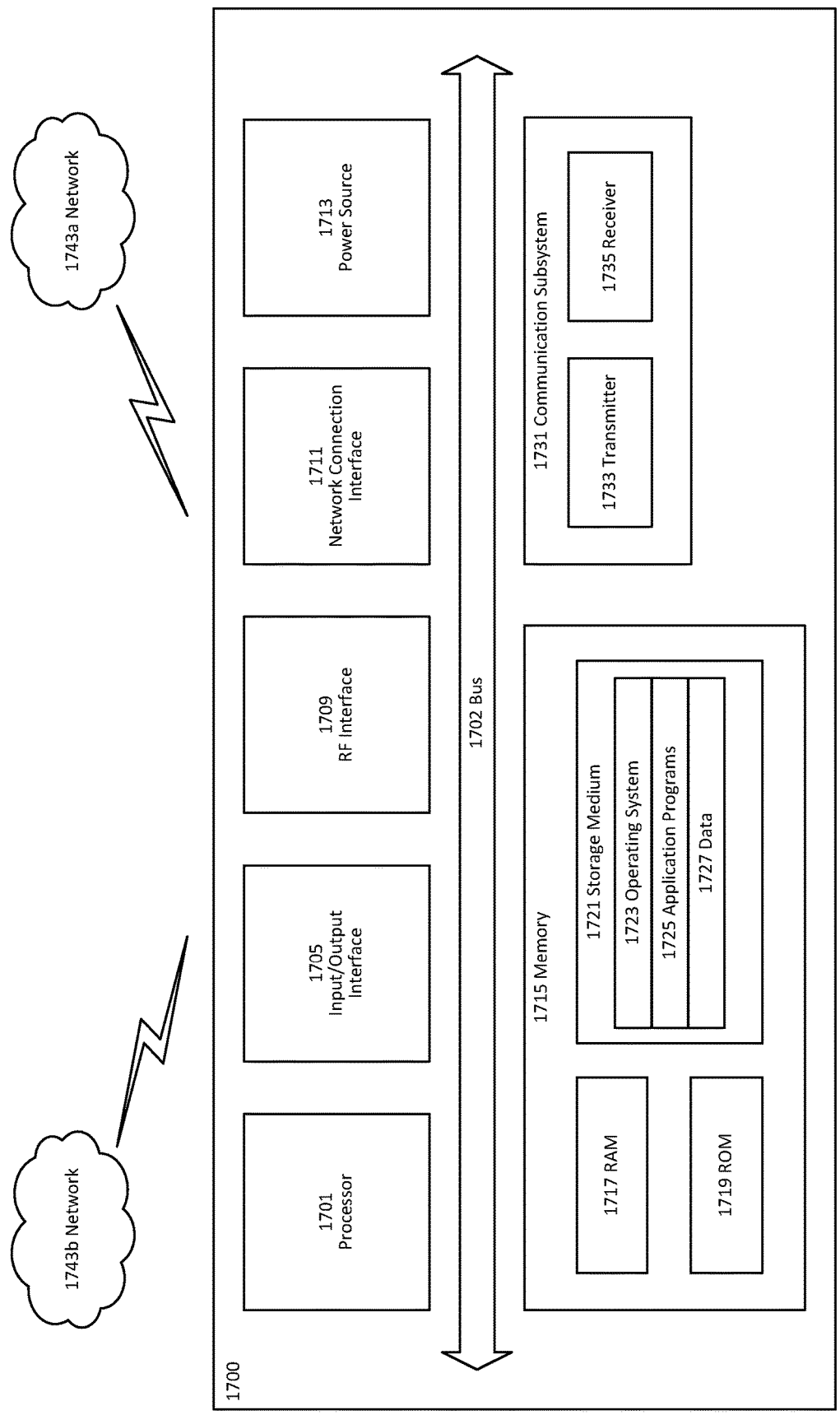
FIG. 17 shows an exemplary UE applicable to the solution presented herein.

FIG. 17 shows one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 17200 may be any UE identified by the $3^{rd}$ Generation Partnership Project (3GPP), including a NB-IoT UE, a machine type communication (MTC) UE, and/or an enhanced MTC (eMTC) UE. UE 1700, as shown in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1709 may be configured to provide a communication interface to RF components such as a transmitter, a receiver, and an antenna. Network connection interface 1711 may be configured to provide a communication interface to network 1743*a*. Network 1743*a* may encompass wired and/or wireless networks such as a local-area network (LAN), a wide-area network (WAN), a computer network, a wireless network, a telecommunications network, another like network or any combination thereof. For example, network 1743*a* may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 17, processing circuitry 1701 may be configured to communicate with network 1743*b* using communication subsystem 1731. Network 1743*a* and network 1743*b* may be the same network or networks or different network or networks. Communication subsystem 1731 may be configured to include one or more transceivers used to communicate with network 1743*b*. For example, communication subsystem 1731 may be configured to include one or more transceivers used to communicate with one or more remote transceivers of another device capable of wireless communication such as another WD, UE, or base station of a radio access network (RAN) according to one or more communication protocols, such as IEEE 802.17, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743*b* may encompass wired and/or wireless networks such as a local-area network (LAN), a wide-area network (WAN), a computer network, a wireless network, a telecommunications network, another like network or any combination thereof. For example, network 1743*b* may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 18:
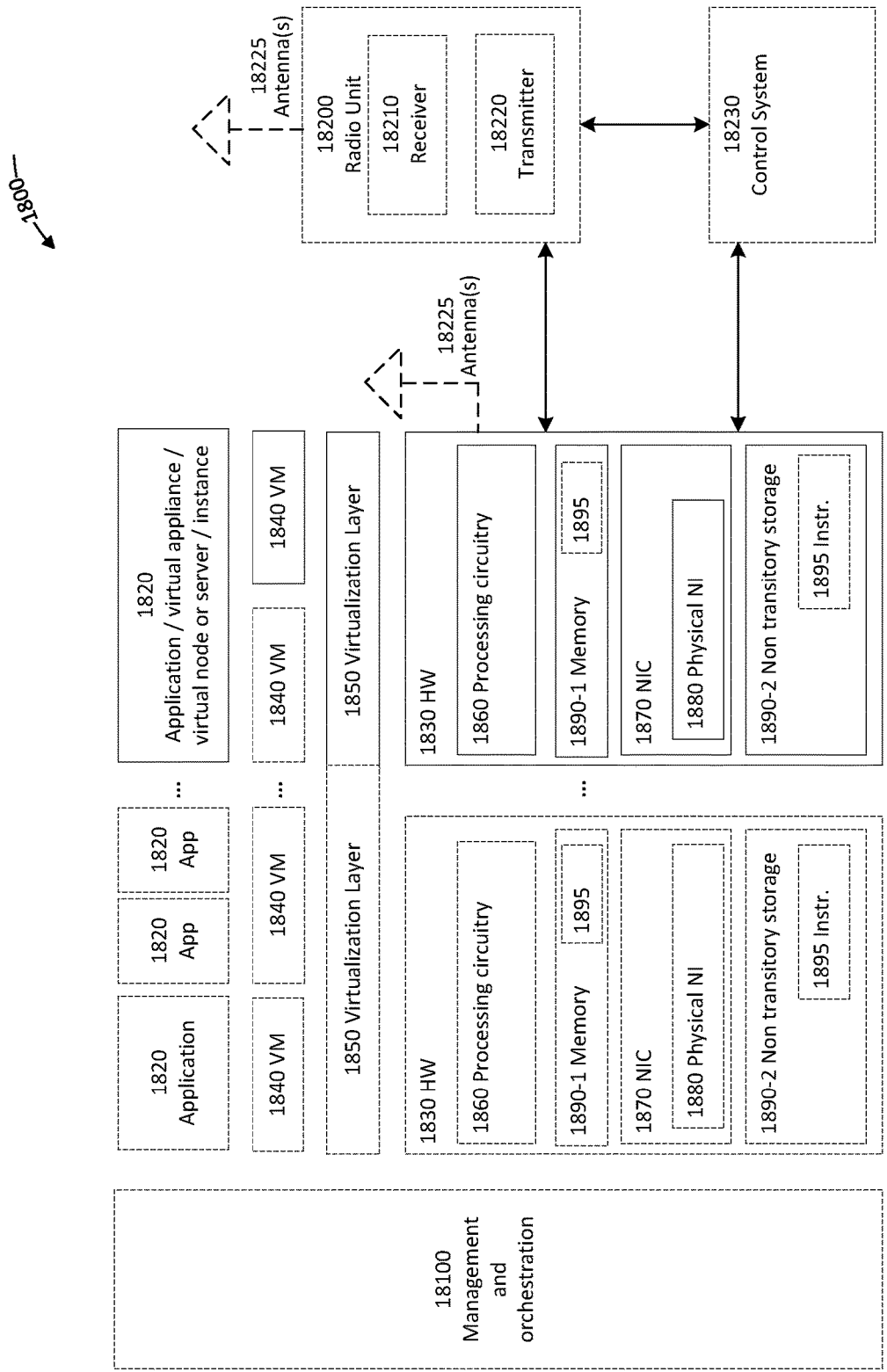
FIG. 18 shows an exemplary virtualization environment applicable to the solution presented herein.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Figure 19:
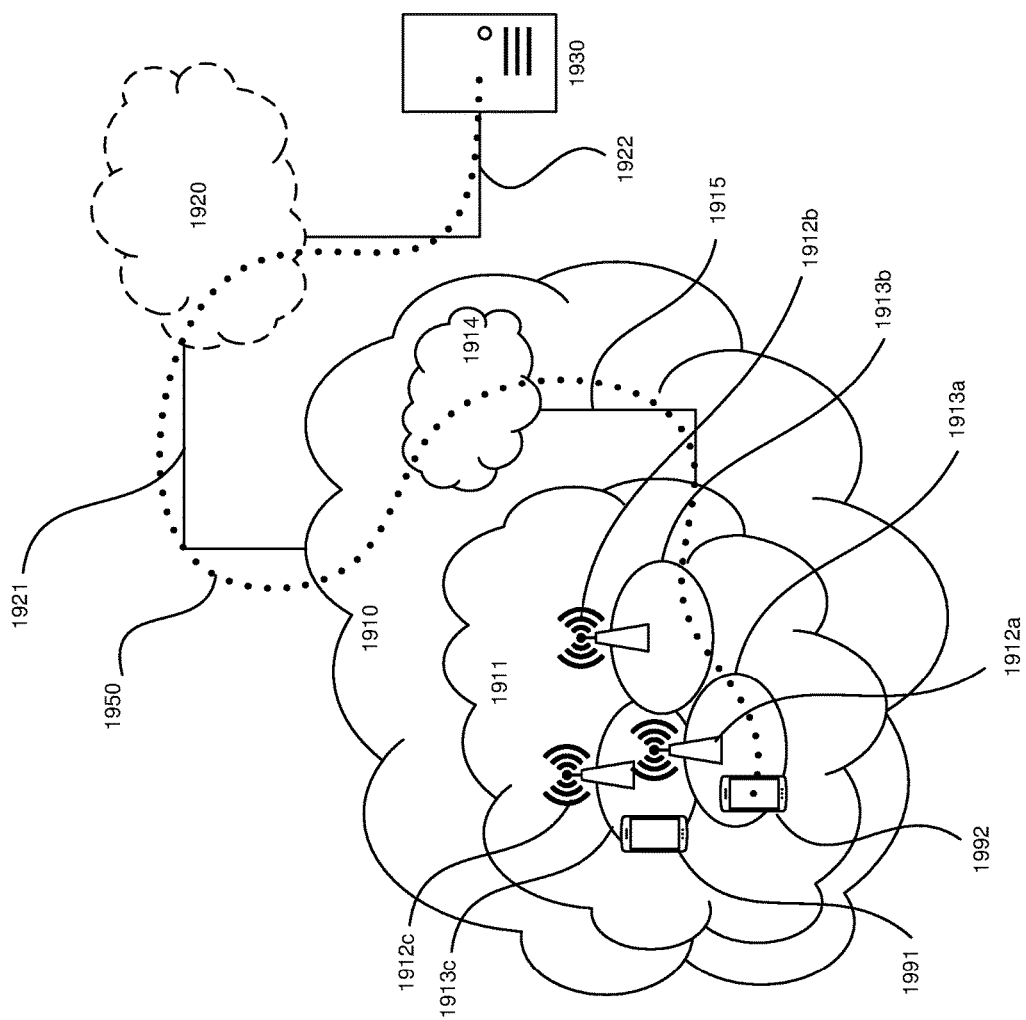
FIG. 19 shows an exemplary telecommunications network applicable to the solution presented herein.

FIG. 19 shows a telecommunication network connected via an intermediate network to a host computer in accordance with some embodiments. In particular, with reference to FIG. 19, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 19 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 20:
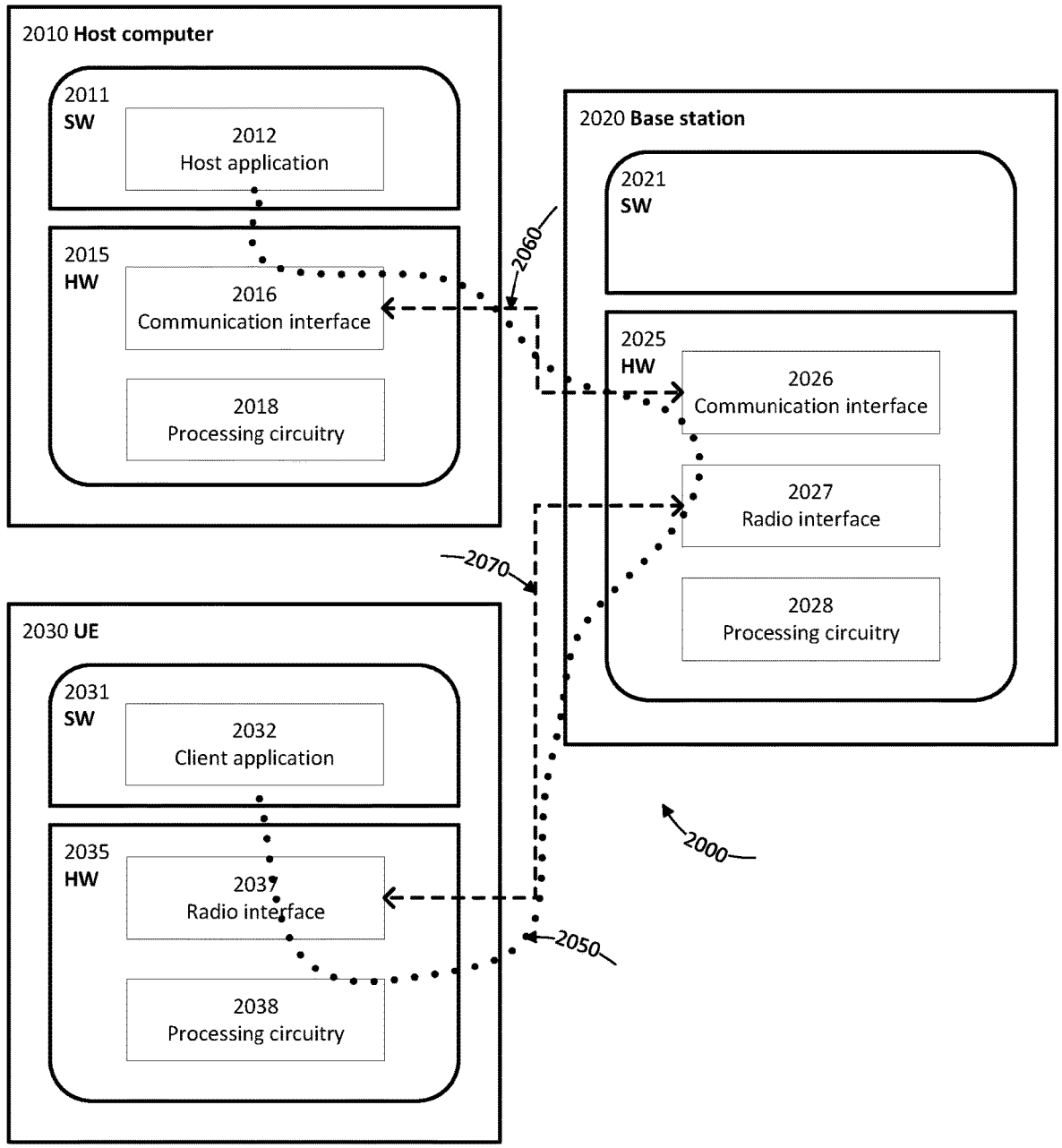
FIG. 20 shows an exemplary host computer applicable to the solution presented herein.

Example implementations, in accordance with an embodiment, of the UE, base station and host computer discussed in the preceding paragraphs will now be described with reference to FIG. 20. FIG. 20 shows host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 20) served by base station 2020. Communication interface 2026 may be configured to facilitate connection 2060 to host computer 2010. Connection 2060 may be direct or it may pass through a core network (not shown in FIG. 20) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 shown in FIG. 20 may be similar or identical to host computer 1930, one of base stations 1912a, 1912b, 1912c and one of UEs 1991, 1992 of FIG. 19, respectively. This is to say, the inner workings of these entities may be as shown in FIG. 20 and independently, the surrounding network topology may be that of FIG. 19.

In FIG. 20, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described throughout this disclosure. One or more of the various embodiments improve the performance of OTT services provided to UE 2030 using OTT connection 2050, in which wireless connection 2070 forms the last segment. More precisely, the teachings of these embodiments may improve the decoding efficiency, overhead, and latency and thereby provide benefits such as lower system load and overall performance increases.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 21:
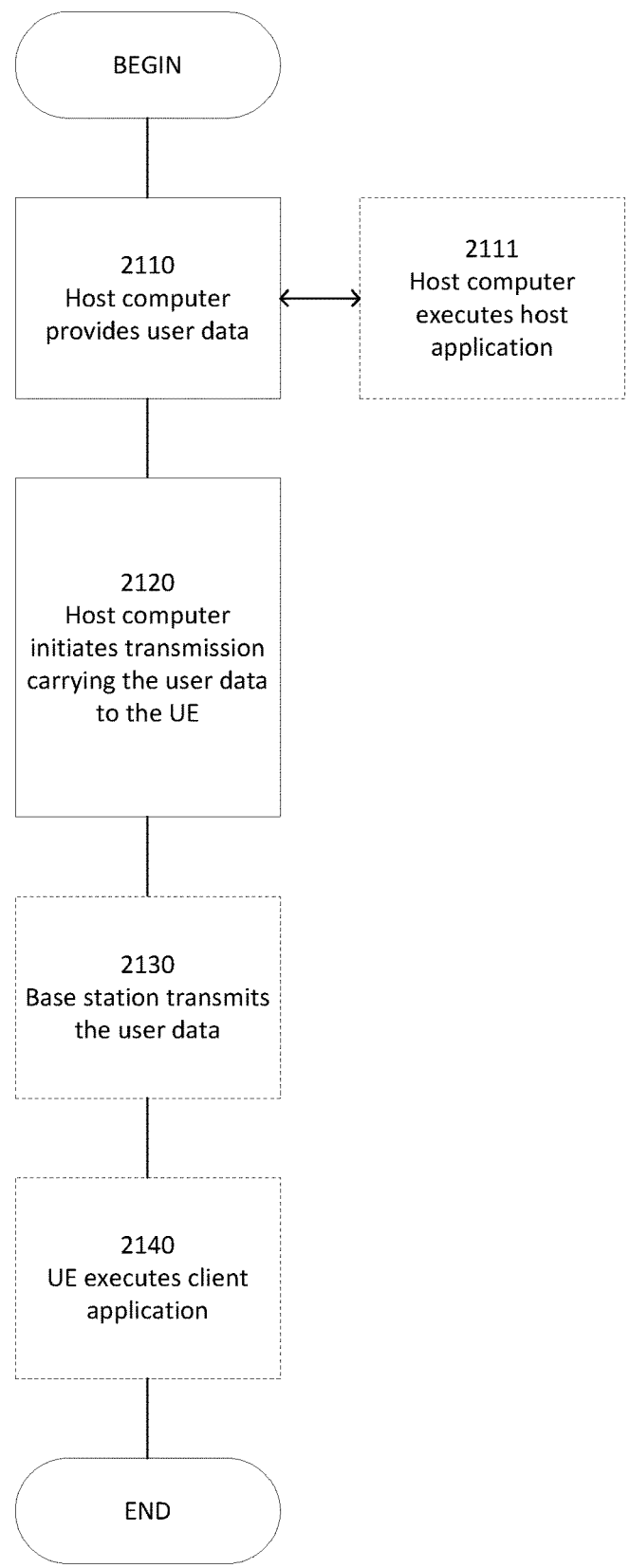
FIG. 21 shows an exemplary method implemented in a communication system in accordance with embodiments of the solution presented herein.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described throughout this disclosure. In step 2140 (which may also be optional), the UE executes a client application associated with the host application executed by the host computer.

Figure 22:
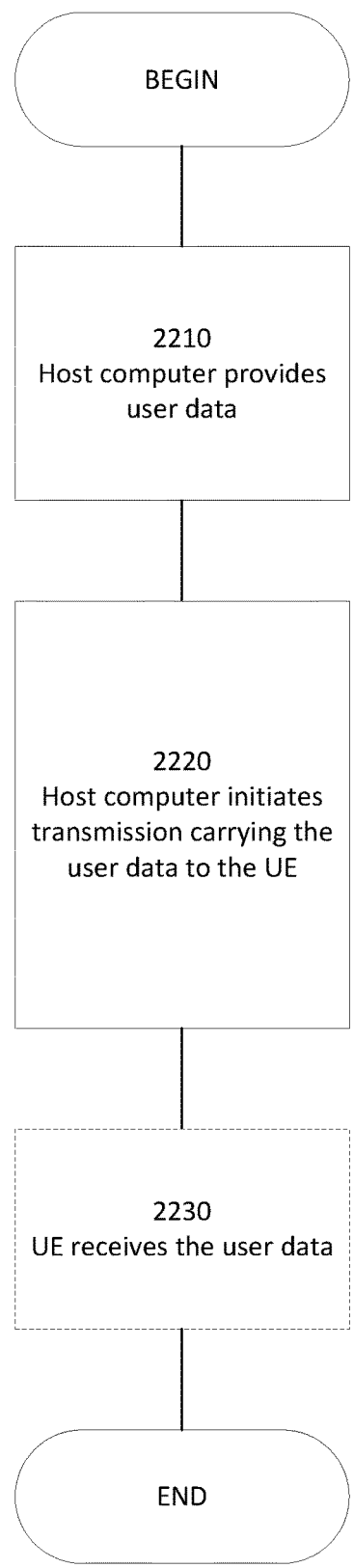
FIG. 22 shows another exemplary method implemented in a communication system in accordance with embodiments of the solution presented herein.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described throughout this disclosure. In step 2230 (which may be optional), the UE receives the user data carried in the transmission.

Figure 23:
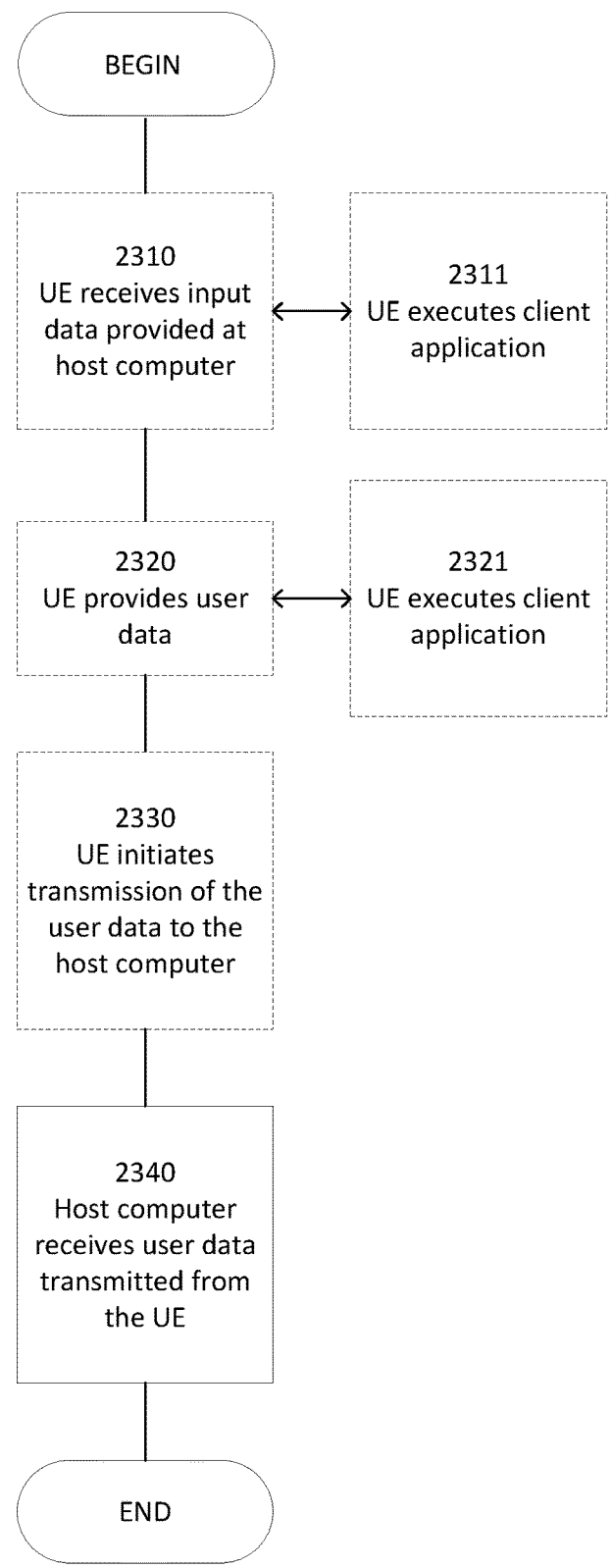
FIG. 23 shows another exemplary method implemented in a communication system in accordance with embodiments of the solution presented herein.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described throughout this disclosure.

Figure 24:
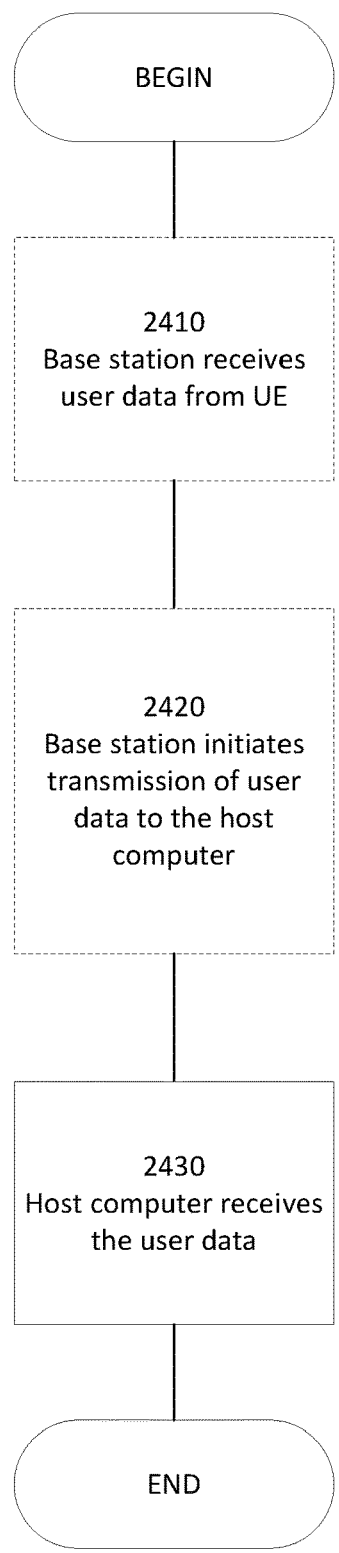
FIG. 24 shows another exemplary method implemented in a communication system in accordance with embodiments of the solution presented herein.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 2410 (which may be optional), in accordance with the teachings of the embodiments described throughout this disclosure, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following examples generally describe the solution presented herein.

Group A Examples—Transmitting Device Method

One example comprises a method performed by a transmitting device for precoding one or more signals to be wirelessly transmitted to a receiving device, the transmitting device and receiving device both implementing antenna diversity. The method comprises applying a same coding scheme to data portions and reference signal portions of the one or more signals, and transmitting the coded one or more signals to the receiving device using multiple transmitting antennas.

In one example, the coding scheme maps different reference signal portions or their conjugates to adjacent subcarriers to be transmitted by different antennas of the multiple transmitting antennas.

In one example, the coding scheme is a space-frequency block coding scheme (SFBC), such as an Alamouti SFBC.

In one example, the coding scheme maps different reference signal portions or their conjugates to adjacent OFDM symbols to be transmitted by different antennas of the multiple transmitting antennas.

In one example, the coding scheme maps different reference signal portions or their conjugates to adjacent resource elements on a time-frequency resource grid to be utilized in transmission of the one or more signals using the multiple transmitting antennas.

In one example, the coding scheme implements time division multiplexing.

In one example, an additional coding operation is applied to the one or more signals after the coding scheme and before transmission of the one or more signals. In one example, the additional coding operation is a digital and/or analog beamforming operation.

In one example, the coding scheme comprises a higher-order diversity coding scheme for three or more transmitting antennas. In one example, the higher-order diversity coding scheme comprises an STBC scheme, SFBC scheme, frequency-switched transmit diversity scheme, a beamforming scheme, and/or a spatial multiplexing scheme.

In one example, the multiple transmitting antennas have multiple polarizations.

In one example, the method further comprises obtaining user data, and forwarding the user data to a host computer or a wireless device.

In one example, the transmitting device is a first network node and the receiving device is a first user equipment. In one example, the transmitting device is a first user equipment and the receiving device is a first network node. In one example, the transmitting device is a first user equipment and the receiving device is a second user equipment.

Group B Examples—Receiving Device Method

One example comprises a method performed by a receiving device for processing one or more signals received via multiple receiver antennas. The method comprises estimating a covariance matrix associated with decoding the received one or more signals, wherein the estimating is based on an assumption that a same coding scheme was applied by a transmitting device to data portions and reference signal portions of the one or more signals, and decoding the one or more signals using the estimated covariance matrix.

In one example, the receiving device is a reference signal minimum mean square error (MMSE) Interference Rejection Combining (IRC) receiver.

In one example, the transmitting device is a first network node and the receiving device is a first user equipment. In one example, the transmitting device is a first user equipment and the receiving device is a first network node. In one example, the transmitting device is a first user equipment and the receiving device is a second user equipment.

In one example, the method further comprises providing user data, and forwarding the user data to a host computer via the transmission to a base station.

Group C Examples—Transmitting and Receiving Device Apparatus

One example comprises a transmitting device configured to perform any of the steps of any of the Group A examples.

One example comprises a transmitting device comprising processing circuitry configured to perform any of the steps of any of the Group A examples; and power supply circuitry configured to supply power to the transmitting device.

One example comprises a transmitting device comprising processing circuitry and memory, the memory containing instructions executable by the processing circuitry whereby the transmitting device is configured to perform any of the steps of any of the Group A examples.

One example comprises a transmitting device comprising an antenna, radio front-end circuitry, processing circuitry, an input interface, an output interface, and a battery. The antenna is configured to send and receive wireless signals. The radio front-end circuitry is connected to the antenna and to the processing circuitry, and is configured to condition signals communicated between the antenna and the processing circuitry. The processing circuitry is configured to perform any of the steps of any of the Group A examples. The input interface is connected to the processing circuitry and is configured to allow input of information into the transmitting device to be processed by the processing circuitry. The output interface is connected to the processing circuitry and is configured to output information from the transmitting device that has been processed by the processing circuitry. The battery is connected to the processing circuitry and configured to supply power to the transmitting device.

One example comprises a computer program comprising instructions which, when executed by at least one processor of a transmitting device, causes the transmitting device to carry out the steps of any of the Group A examples. In one example, a carrier contains this computer program, where the carrier is one of an electronic signal, optical signal, radio signal, or computer readable storage medium.

One example comprises a receiving device configured to perform any of the steps of any of the Group B examples.

One example comprises a receiving device comprising processing circuitry configured to perform any of the steps of any of the Group B examples, and power supply circuitry configured to supply power to the receiving device.

One example comprises a receiving device comprising processing circuitry and memory, the memory containing instructions executable by the processing circuitry whereby the receiving device is configured to perform any of the steps of any of the Group B examples.

One example comprises a computer program comprising instructions which, when executed by at least one processor of a receiving device, causes the receiving device to carry out the steps of any of the Group B examples. In one exemplary embodiment, a carrier contains this computer program, where the carrier is one of an electronic signal, optical signal, radio signal, or computer readable storage medium.

Group D Examples

One example comprises a communication system including a host computer comprising processing circuitry configured to provide user data, and a communication interface configured to forward the user data to a cellular network for transmission to a transmitting device, wherein the cellular network comprises a receiving device, where the receiving device has a radio interface and processing circuitry, and where the receiving device's processing circuitry is configured to perform any of the steps of any of the Group B examples.

In one example, the communication system further includes the receiving device. The communication system may alternatively or additionally include the transmitting device, wherein the transmitting device is configured to communicate with the receiving device.

In one example, the transmitting device is a first network node, e.g., a base station, and the receiving device is a first user equipment. In one example, the transmitting device is a first user equipment and the receiving device is a first network node, e.g., a base station. In one example, the transmitting device is a first user equipment and the receiving device is a second user equipment.

In one example, the processing circuitry of the host computer is configured to execute a host application, thereby providing the user data, and the transmitting device comprises processing circuitry configured to execute a client application associated with the host application.

One example comprises a method implemented in a communication system including a host computer, a receiving device, and a transmitting device. The method comprises, at the host computer, providing user data, and at the host computer, initiating a transmission carrying the user data to the transmitting device via a cellular network comprising the receiving device, wherein the receiving device performs any of the steps of any of the Group B examples.

In one example, the method further comprises, at the receiving device, transmitting the user data.

In one example, the user data is provided at the host computer by executing a host application, where the method further comprises, at the transmitting device, executing a client application associated with the host application.

One example comprises a transmitting device configured to communicate with a receiving device, the transmitting device comprising a radio interface and processing circuitry configured to perform any of the previous 3 examples.

One example comprises a communication system including a host computer comprising processing circuitry and a communication interface. The processing circuitry is configured to provide user data. The communication interface is configured to forward user data to a cellular network for transmission by a transmitting device, where the transmitting device comprises a radio interface and processing circuitry, the transmitting device's processing circuitry being configured to perform any of the steps of any of the Group A examples.

In one example, the cellular network further includes the transmitting device configured to communicate with a receiving device, where the receiving device has a radio interface and processing circuitry.

In one example, the processing circuitry of the host computer is configured to execute a host application, thereby providing the user data, and the receiving device's processing circuitry is configured to execute a client application associated with the host application.

One example comprises a method implemented in a communication system including a host computer, a transmitting device, and a receiving device. The method comprises, at the host computer, providing user data, and at the host computer, initiating a transmission carrying the user data to the receiving device via a cellular network comprising the transmitting device, wherein the transmitting device performs any of the steps of any of the Group A examples.

In one example, the method further comprises, at the receiving device, receiving the user data from the transmitting device.

A further introduction and examples illustrating the teachings herein is given below.

RAN plenary #75 approved a work item (RP-170798, New WID on 3GPP V2X Phase 2) for 3GPP V2X Phase 2 to support advanced V2X services as identified in SA1 TR 22.886. The following topic is a part of the detailed objectives of this work item:
1. Study the feasibility and gain of PC5 operation with Transmit Diversity, assuming this PC5 functionality would co-exist in the same resource pools as Rel-14 functionality and use the same scheduling assignment format (which can be decoded by Rel-14 UEs), without causing significant degradation to Rel-14 PC5 operation compared to that of Rel-14 UEs, and specify this PC5 functionality if justified. [RAN1, RAN2, RAN4]

In this work item, no new numerology, waveform, and channel coding will be considered.

Then, in RAN1 #88bis, transmit diversity was discussed and candidate TxD schemes for PSSCH were agreed as follows (RAN1 #88bis agreements).

Agreement:
At least the following candidate TxD schemes for PSSCH transmission to be evaluated:
Small delay CDD
STBC (including half symbol STBC proposal in R1-1705002)
SFBC
PVS in time domain
Note: other schemes are not precluded Additionally, the following was agreed regarding DMRS design when transmit diversity is applied.

Agreement:
When only one antenna port is applied, legacy DMRS pattern is reused.
For the case that more than one antenna port is applied, the time location of DMRS is the same as Rel-14.
Channel estimation and demodulation details should be provided by proponents
There should be analysis on impact to Rel-14 UE provided following with evaluation assumption and link and/or system simulations, including interference increase of Rel-15 UEs over Rel-14 UEs
Details FFS Moreover, in RAN1 #89 (RAN1 #89 agreements), the following was agreed.

Agreement:
Legacy Rel-14 DMRS pattern with single antenna port, including time-frequency location, sequence, and cyclic shift, is applied to PSCCH transmission.

In RAN1 #90 (RAN1 #90 agreements), the following working assumptions were summarized from offline discussions.

Working Assumption (may be revisited based on RAN4 response):
For designing PSSCH, RAN1 assumes the use of two-port non-transparent transmit diversity
The use of non-transparent transmit diversity is configured.
Details, including diversity scheme, are FFS
Support of transmission and/or reception up to UE capability
Note: It is RAN1 understanding that requirements on capabilities can be set at regional level and are outside 3GPP scope
Send LS to RAN4 to ask their opinion about when non-transparent scheme for transmit diversity is used by Rel-15 UEs:
Impact on Rel-14 UEs of PSSCH-RSRP measurement accuracy
MPR for Rel-15 UEs
Non-transparent Transmit diversity is not used in the following cases:
When communicating with Rel-14 UEs
When there is a high probability of resource collision with Rel-14 UEs
Note: Some companies observe that the performance of MMSE-IRC receiver degrades when a non-transparent Transmit diversity scheme is used in interference limited scenarios with a dominant interferer In this contribution, we will discuss DMRS design for PSSCH transmissions using two-port TxD schemes. Discussions on TxD schemes are presented in our companion contribution (R1-1717734, "Transmit diversity solutions for Rel-15 PSCCH and PSSCH transmissions," Ericsson).

As a companion contribution, we discuss the potential TxD solution in R1-1717734, where we propose to specify Alamouti SFBC due to its good diversity behavior. Because Alamouti SFBC is a type of two-port transmission schemes, in the following we will discuss two-port DMRS design.

For two-port PSSCH transmission, DMRS structure should be designed such that the channels for the two antenna ports can be estimated separately. In this regard, it has been agreed in RAN1 #88bis that for the case that more than one antenna port is applied, the time location of DMRS is the same as Rel-14. In addition to the agreement, from our perspective, the DMRS design should fulfil the following four targets:
Target 1: A Rel-15 receiver is able to separate and estimate the channels from the two antenna ports respectively.
Target 2: A Rel-14 receiver can still measure PSSCH-RSRP using DMRS without significant performance loss.
Target 3: Low CM characteristics are maintained for transmitting DMRS symbols.
Target 4: Channel estimation performance of a legacy Rel-14 UE will not be degraded.

In our previous contribution (R1-1713990, "DMRS design for Rel. 15 V2X transmissions with transmit diversity," Ericsson), we have observed that in general a CDM way of DMRS multiplexing for the two ports is more efficient compared to an FDM way in terms of the four targets above. In the following, we will present two DMRS alternatives that belong to CDM based DMRS.

Alternative 1: two DMRS sequences for the two antenna ports are generated from different cyclic shifts of the same base sequence, where one of them is selected in the same way as in legacy Rel-14. The legacy Rel-14 DMRS sequence is applied to the two antenna ports in turn on the four DMRS symbols within a subframe.

In this alternative, the DMRS sequence for one of the antenna ports is generated in the same way as that in legacy Rel-14, while the DMRS sequence for the other antenna port uses a different cyclic shift. To ensure that both Tx antennas contribute to the RSRP measurement, the legacy sequence is alternately applied to the two antenna ports over the four DMRS symbols within a subframe. Moreover, in Rel-14, the potential cyclic shift value is within the range [0,7]. To further increase the number of orthogonal RS sequences generated from different cyclic shifts, we consider [0,11] as the range of the cyclic shift value for the non-legacy antenna port.

With alternative 1, the channels from the two antenna ports can be estimated separately by a Rel-15 receiver due to the orthogonality between the two DMRS sequences, which satisfies target 1. Also, it is clear that the CM characteristics of both DMRS ports will be the same with legacy Rel-14 single-port DMRS, which satisfies target 3. Additionally, the performance of channel estimation for demodulation of Rel-14 is not affected because the DMRS sequences are orthogonal.

However, when a Rel-14 receiver measures PSSCH-RSRP using legacy procedure, there is a 3 dB loss due to the halved transmit power at each antenna port. This may degrade the accuracy of RSRP measurements.

Observation 1:
For alternative 1, i.e., using one legacy DMRS sequence for one antenna port and a cyclic-shifted version of that sequence for the other port, and the legacy sequence is alternately applied to the two antenna ports over the four DMRS symbols:
Channel estimation for Rel-15 Alamouti SFBC-based PSSCH transmissions is supported.
RSRP measurements are reduced by 3 dB.
CM does not change.
Channel estimation performance of legacy Rel-14 UEs will not be degraded.

In the following, we propose an alternative DMRS structure that enables an efficient Release-15 IRC receiver implementation.

Alternative 2: two DMRS sequences for the two antenna ports are generated from a single legacy Rel-14 DMRS sequence. One of them is selected in the same way as in legacy Rel-14. The second one is generated by applying Alamouti SFBC precoding to the first one. The legacy Rel-14 DMRS sequence is alternatively applied to the two antenna ports over the four DMRS symbols within a subframe.

Figure 15A:
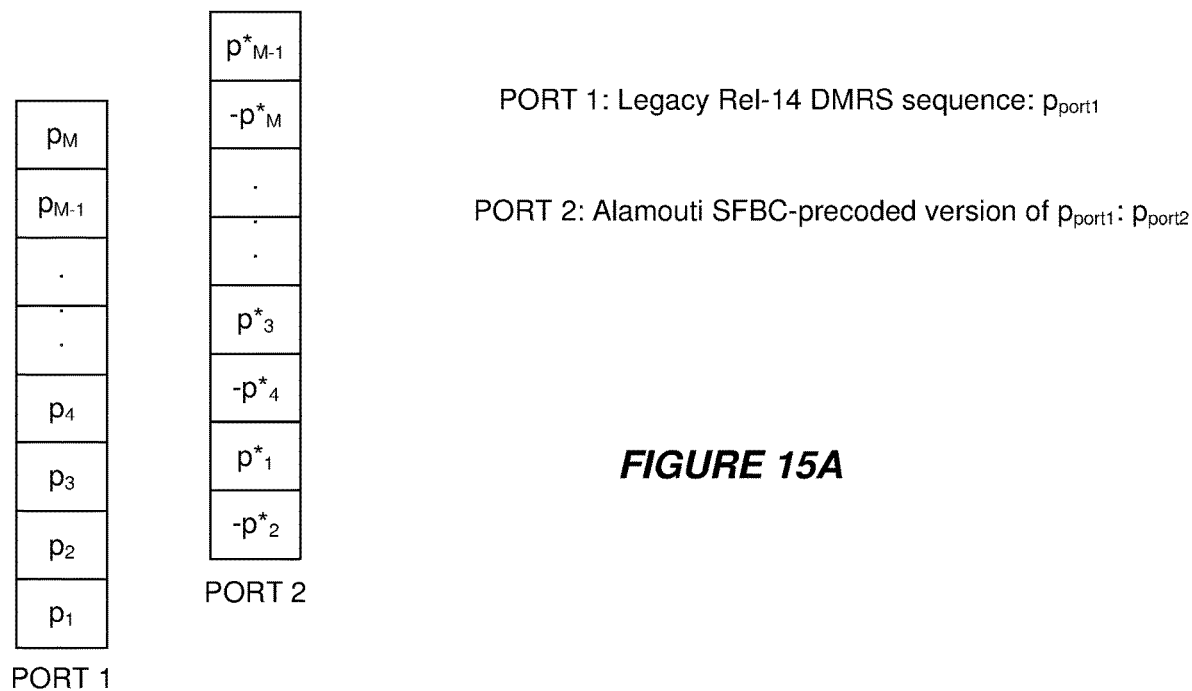
FIG. 15A shows an exemplary alternative DMRS structure according to exemplary embodiments.

In this alternative, the DMRS sequence for one of the antenna ports is generated in the same way as that in legacy Rel-14, while the DMRS sequence for the other antenna port is generated from the Alamouti SFBC processing outcome of the first one. Alternative 2 is shown in FIG. 15A, where the legacy Rel-14 DMRS sequence is $p_{port1}=[p_1, p_2, p_3, p_4, \ldots, p_M, p_{M-1}]$ and the Alamouti SFBC-precoded version of $p_{port1}$ is $p_{port2}=[-p_2^*, p_1^*, -p_4^*, p_3^*, \ldots, -p_M^*, p_{M-1}]$. To ensure that both Tx antennas contribute to the RSRP measurement, the legacy sequence is alternately applied to the two antenna ports over the four DMRS symbols within a subframe.

With alternative 2, the channels from the two antenna ports can be estimated separately by a Rel-15 receiver due to the orthogonality between the two DMRS sequences, which satisfies target 1. Regarding CM analysis, it is clear that CM of the first-port DMRS sequence will be kept the same with that of a single-port DMRS, i.e., legacy Rel-14 DMRS. On the other hand, compared to single-port DMRS, there will be a small CM increase for the second-port DMRS sequence due to the SFBC processing. Based on the simulation evaluations given in the description herein in relation to FIG. 15B, the CM increase will be less than 1.5 dB for all the considered scenarios (i.e., different PSSCH bandwidth). Similar CM evaluation results can be found in R1-1708558, "Transmit diversity schemes for V2XPC5," Nokia, for SFBC-based data transmission. Moreover, as stated in R1-1712485 "Evaluation of Candidate Transmit Diversity Schemes for LTE V2V Sidelink Communication" Intel Corp., "it should be noted that difference in CM of TxD schemes with respect to the single antenna port does not give a full picture, given that if multiple antenna ports are used the max transmit power per antenna port is scaled down by X dB, where X=3 dB for the case of two Tx antennas. Hence, in case of TxD scheme with two antenna ports, the transmit power per antenna port is 3 dB less with respect to single antenna port that can relax CM requirements." Hence, the CM increase of alternative 2 is in general not significant and in practice is mostly compensated by the power reduction of two-antenna transmission.

Additionally, the performance of channel estimation for demodulation of Rel-14 is not affected because the DMRS sequences are orthogonal.

However, when a Rel-14 receiver measures PSSCH-RSRP using legacy procedure, there is a 3 dB loss due to the halved transmit power at each antenna port. This may degrade the accuracy of RSRP measurements.

Finally, alternative 2 has the special property that both DMRS symbols and payload symbols have the same covariance matrix of interference plus noise. This property can be used for implementing a Release-15 MMSE-IRC receiver that processes the channel outputs in groups of two Rx antennas and two subcarriers (i.e., the pair of subcarriers used in SFBC). In this way, the received signal space has dimension 4 and allows for MMSE-IRC decoding of a desired signal consisting of two streams in the presence of a strong interferer with two streams. The receiver is described in detail further below.

Observation 2:
For alternative 2, i.e., using one legacy DMRS sequence for one antenna port and an Alamouti SFBC-precoded version of that sequence for the other port, and the legacy sequence is alternately applied to the two antenna ports over the four DMRS symbols:
Channel estimation for Rel-15 Alamouti SFBC-based PSSCH transmissions is supported.
RSRP measurements are reduced by 3 dB.
Minor CM increase.
Channel estimation performance of legacy Rel-14 UEs will not be degraded.
The performance of an MMSE-IRC receiver (if applied) will be maintained compared to a single-port PSSCH transmission.

Based on the analysis above, we propose the following.
Proposal 1:
CDM-based two-port PSSCH DMRS structure is used to support Alamouti SFBC-based PSSCH transmission:
The first DMRS sequence is the Release 14 sequence.
The second DMRS sequence is obtained by applying SFBC precoding to the first sequence
The sequences are alternately applied to the two antenna ports over the four DMRS symbols within a subframe.

Clearly, for alternative 1, the CM characteristics of both DMRS ports will be the same with legacy Rel-14 single-port DMRS. For alternative 2, CM of the first-port DMRS sequence will be the same with that of a single-port legacy Rel-14 DMRS. Hence, in the following, we will evaluate CM properties of the second-port DMRS sequence in alternative 2. To do that, we simulate CM for DMRS symbols based on the CM calculation given in R1-060023, "Cubic metric in 3GPP-LTE," Motorola. Note that the offset value 0.77 dB in R1-060023, "Cubic metric in 3GPP-LTE," Motorola accounting for bandwidth change is not considered, because our focus is on CM increase compared to single-port DMRS.

Figure 15B:
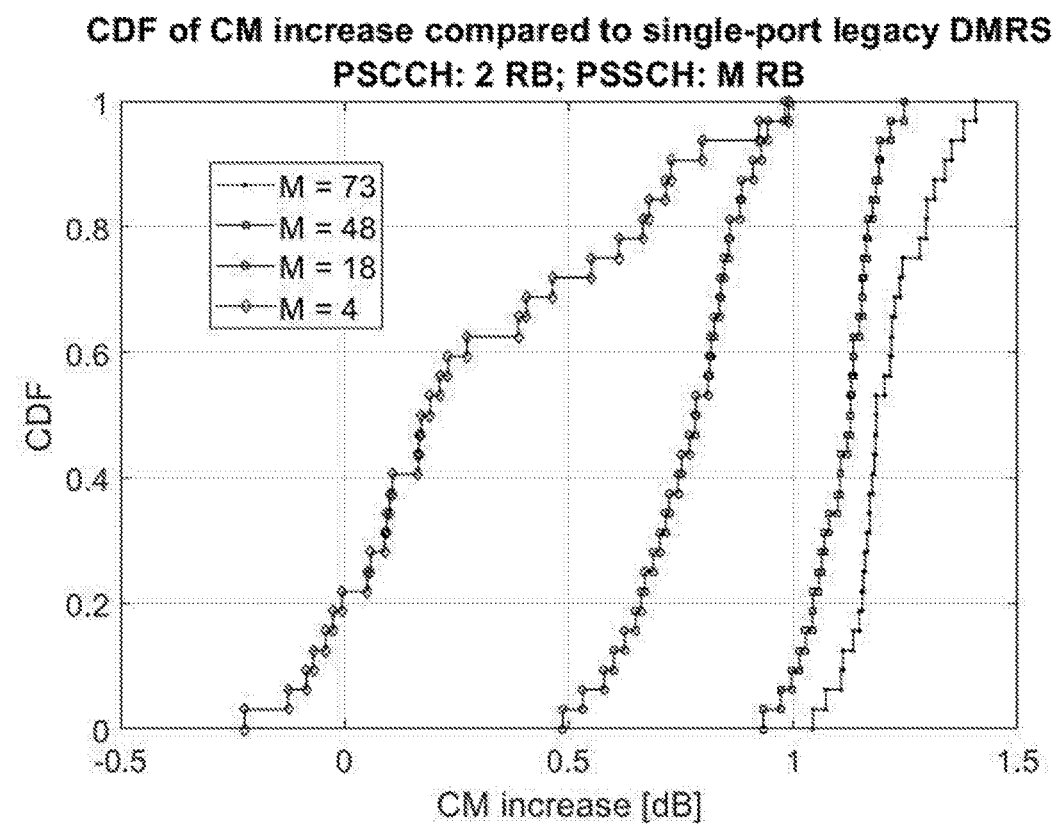
FIG. 15B shows exemplary simulation results.

Simulation results are presented in FIG. 15B to plot the CM increase of the second-port DMRS in alternative 2 compared to a single-port legacy Rel-14 DMRS, where the 3 dB PSD boosting of PSCCH over PSSCH is considered. Here CDFs of CM are obtained by iterating over DMRS sequences with different cyclic shifts and with different root indexes of the involved Zadoff-Chu sequences. As shown by the results, the CM increase is not significant, i.e., less than 1.5 dB for all the considered scenarios with different PSSCH bandwidth.

In this contribution, we have discussed some potential two-port DMRS designs for Rel-15 two-port PSSCH transmissions. We have the following observations.

Observation 1:

For alternative 1, i.e., using one legacy DMRS sequence for one antenna port and a cyclic-shifted version of that sequence for the other port, and the legacy sequence is alternately applied to the two antenna ports over the four DMRS symbols:
  Channel estimation for Rel-15 Alamouti SFBC-based PSSCH transmissions is supported.
  RSRP measurements are reduced by 3 dB.
  CM does not change.
  Channel estimation performance of legacy Rel-14 UEs will not be degraded.

Observation 2:

For alternative 2, i.e., using one legacy DMRS sequence for one antenna port and an Alamouti SFBC-precoded version of that sequence for the other port, and the legacy sequence is alternately applied to the two antenna ports over the four DMRS symbols:
  Channel estimation for Rel-15 Alamouti SFBC-based PSSCH transmissions is supported.
  RSRP measurements are reduced by 3 dB.
  Minor CM increase.
  Channel estimation performance of legacy Rel-14 UEs will not be degraded.
  The performance of an MMSE-IRC receiver (if applied) will be maintained compared to a single-port PSSCH transmission.

Based on the analysis above, we propose the following.

Proposal 1:

CDM-based two-port PSSCH DMRS structure is used to support Alamouti SFBC-based PSSCH transmission:
  The first DMRS sequence is the Release 14 sequence.
  The second DMRS sequence is obtained by applying SFBC precoding to the first sequence
  The sequences are alternately applied to the two antenna ports over the four DMRS symbols within a subframe.

FIG. 14 shows a combination of the proposed DMRS structure alternative 2 and an RS-based IRC receiver.

As shown in FIG. 14, transmitting device or transmitter A is the desired transmitting device or transmitter and transmitting device or transmitter B is the co-channel interference source. To show the proof, it is assumed that both transmitting devices or transmitters are Rel-15 UEs using SFBC diversity scheme. In this way, the received signal at a pair of SFBC subcarriers at the receiving device or receiver can be expressed as $$\underbrace{\begin{bmatrix} y11 \\ y21 \\ y12^* \\ y22^* \end{bmatrix}}_{\triangleq y} = \underbrace{\begin{bmatrix} h11 & -h12 \\ h21 & -h22 \\ h12^* & h11^* \\ h22^* & h21^* \end{bmatrix}}_{\triangleq H} \underbrace{\begin{bmatrix} p1 \\ p2^* \end{bmatrix}}_{\triangleq p} + \underbrace{\begin{bmatrix} g11 & -g12 \\ g21 & -g22 \\ g12^* & g11^* \\ g22^* & g21^* \end{bmatrix}}_{\triangleq G} \underbrace{\begin{bmatrix} q1 \\ q2^* \end{bmatrix}}_{\triangleq q} + \underbrace{\begin{bmatrix} n11 \\ n21 \\ n12^* \\ n22^* \end{bmatrix}}_{noise} \quad (A1)$$

desired signal    interference

Note that DMRS transmission is given as an example in Equation (A1). Nevertheless, Equation (A1) can be applied to both data transmission and DMRS transmission. This implies that data and DMRS transmissions experience the same covariance matrix of interference plus noise. Hence, DMRS can be used to estimate the covariance matrix of interference plus noise needed in MMSE IRC receiver for decoding data.

To implement MMSE IRC receiver, the receiver weight matrix is given as $$W_{RX,IRC} = H^H(HH^H + R_{I+N})^{-1} \quad (A2)$$

where $R_{I+N} \triangleq R_I + \sigma^2 I = GG^H + \sigma^2 I$ is defined as the covariance matrix of interference plus noise, and $R_I \triangleq GG^H$. Note that the 4 by 4 matrix $R_I$ has rank 2, which provides enough degree of freedom at the receiving device or receiver to both decode the desired data from transmitting device or transmitter A and suppress the interference from transmitting device or transmitter B.

In RS-based MMSE IRC receiver, both H and $R_{I+N}$ are estimated from RS. More specifically, from Equation (A1), we see that the desired channel H, which includes four unknown variables, can be estimated by the received signal y and the known DMRS p using for instance least squares estimation, which is given as $$\begin{bmatrix} \hat{h}11 \\ \hat{h}21 \\ \hat{h}12 \\ \hat{h}22 \end{bmatrix} = \begin{bmatrix} \dfrac{p1^* y11 + p2^* y12}{|p1|^2 + |p2|^2} \\ \dfrac{p1^* y21 + p2^* y22}{|p1|^2 + |p2|^2} \\ \dfrac{p1 y12 - p2 y11}{|p1|^2 + |p2|^2} \\ \dfrac{p1 y21 - p2 y21}{|p1|^2 + |p2|^2} \end{bmatrix} \quad (A3)$$

In this way, the channel estimate matrix $\hat{H}$ becomes $$\hat{H} = \begin{bmatrix} \hat{h}11 & -\hat{h}12 \\ \hat{h}21 & -\hat{h}22 \\ \hat{h}12^* & \hat{h}11^* \\ \hat{h}22^* & \hat{h}21^* \end{bmatrix} \quad (A4)$$

The expression in Equation (A3) is just an example of channel estimation methods, which can be further filtered across frequency and/or time (according to the coherence bandwidth and time of the channel) in order to attain a processing gain and produce a more accurate channel estimate $\hat{H}$.

Moreover, the covariance matrix of interference plus noise $R_{I+N}$ can be estimated as $$\hat{R}_{I+N} = E\{\tilde{y}\tilde{y}^H\} = E\{(y - \hat{H}p)(y - \hat{H}p)^H\}, \quad (A5)$$

where E{.} represents the expectation, i.e., the average, over all DMRS positions that experience the same or similar covariance matrix of interference plus noise $R_{I+N}$, and $$\tilde{y} = y - \hat{H}p \quad (A6)$$

is the estimated interference plus noise at the receiving device or receiver.

For easier explanation, here we only consider two adjacent DMRS positions (i.e., a pair of SFBC subcarriers) at the receiving device or receiver in Equation (A1). In fact, the same idea can be applied to all the RS positons. Then $\tilde{y}$ in Equation (A6) can be calculated correspondingly for different DMRS positions and different DMRS sequences. In this way, a set of ỹ values can contribute to the calculation of the expectation in Equation (A5).

Then, the estimated covariance matrix of interference plus noise $\hat{R}_{I+N}$ can be used by an IRC receiver to decode data transmission and we have $$\hat{x} = \hat{H}^H (\hat{H}\hat{H}^H + \hat{R}_{I+N})^{-1} y \quad (A7)$$

where $\hat{x}$ represents the decoded symbol on the considered resource elements (REs), $\hat{H}$ and $\hat{R}_{I+N}$ are obtained from Equation (A4) and Equation (A5) respectively, and y is the received signal vector on the considered REs.

The example in FIG. 14 and the analysis above demonstrate the important advantage of combining DMRS structure alternative 2 and an IRC receiver. Indeed, by alternative 2, we can achieve that 1) data transmission and DMRS transmission experience the same covariance matrix of interference plus noise;
2) the covariance matrix of interference $R_1 \triangleq GG^H$ is not full rank, which provides enough degree of freedom for an efficient IRC.

In the above example, we assume that both transmitting devices or transmitters A and B are Rel-15 UEs using SFBC. Actually, the whole receiver processing and mathematical proof are still valid if either one of the two transmitting devices or transmitters, or both of the two transmitting devices or transmitters, are Rel-14 UEs. In this case, the legacy Rel-14 DMRS structure will be applied to a Rel-14 UE.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| CAM | Cooperative Awareness Message |
| CDD | Cyclic Delay Diversity |
| CE | Channel Estimation |
| CRS | Cell-Specific Reference Signal |
| CSI | Channel State Information |
| D2D | Device-to-Device Communication |
| DENM | Decentralized Environmental Notification Message |
| DL | Downlink |
| ETSI | European Telecommunications Standards Institute |
| FFT | Fast Fourier Transform |
| FSTD | Frequency Switched Transmit Diversity |
| IBE | In-Band Emission |
| IFFT | Inverse Fast Fourier Transform |
| IRC | Interference Rejection Combining |
| LTE | Long-Term Evolution |
| MMSE | Minimum Mean Square Error |
| MRC | Maximal-Ratio combining |
| NR | New Radio |
| NW | Network |
| OFDM | Orthogonal Frequency-Division Multiplexing |
| ProSe | Proximity Services |
| RS | Reference Signal |
| RE | Resource Element |
| Rx | Receiver |
| SFBC | Space-Frequency Block Coding |
| SINR | Signal-to-Interference-plus-Noise Ratio |
| STBC | Space-Time Block Coding |
| Tx | Transmitter |
| UE | User Equipment |
| UL | Uplink |
| V2I | Vehicle-to-Infrastructure |
| V2P | Vehicle-to-Pedestrian |
| V2V | Vehicle-to-vehicle communication |

-continued

| Abbreviation | Explanation |
| --- | --- |
| V2X | Vehicle-to-anything-you-can-imagine |
| 1x RTT | CDMA2000 1x Radio Transmission Technology |
| 3GPP | 3rd Generation Partnership Project |
| 5G | 5th Generation |
| ABS | Almost Blank Subframe |
| ARQ | Automatic Repeat Request |
| AWGN | Additive White Gaussian Noise |
| BCCH | Broadcast Control Channel |
| BCH | Broadcast Channel |
| CA | Carrier Aggregation |
| CC | Carrier Component |
| CCCH SDU | Common Control Channel SDU |
| CDF | Cumulative Distribution Function |
| CDMA | Code Division Multiplexing Access |
| CGI | Cell Global Identifier |
| CIR | Channel Impulse Response |
| CM | Cubic Metric |
| CP | Cyclic Prefix |
| CPICH | Common Pilot Channel |
| CPICH Ec/No | CPICH Received energy per chip divided by the power density in the band |
| CQI | Channel Quality information |
| C-RNTI | Cell RNTI |
| CSI | Channel State Information |
| DCCH | Dedicated Control Channel |
| DL | Downlink |
| DM | Demodulation |
| DMRS | Demodulation Reference Signal |
| DRX | Discontinuous Reception |
| DTX | Discontinuous Transmission |
| DTCH | Dedicated Traffic Channel |
| DUT | Device Under Test |
| E-CID | Enhanced Cell-ID (positioning method) |
| E-SMLC | Evolved-Serving Mobile Location Centre |
| ECGI | Evolved CGI |
| eNB | E-UTRAN NodeB |
| ePDCCH | enhanced Physical Downlink Control Channel |
| E-SMLC | evolved Serving Mobile Location Center |
| E-UTRA | Evolved UTRA |
| E-UTRAN | Evolved UTRAN |
| FDD | Frequency Division Duplex |
| FFS | For Further Study |
| GERAN | GSM EDGE Radio Access Network |
| gNB | Base station in NR |
| GNSS | Global Navigation Satellite System |
| GSM | Global System for Mobile communication |
| HARQ | Hybrid Automatic Repeat Request |
| HO | Handover |
| HSPA | High Speed Packet Access |
| HRPD | High Rate Packet Data |
| LOS | Line of Sight |
| LPP | LTE Positioning Protocol |
| LTE | Long-Term Evolution |
| MAC | Medium Access Control |
| MBMS | Multimedia Broadcast Multicast Services |
| MBSFN | Multimedia Broadcast multicast service Single Frequency Network |
| MBSFN ABS | MBSFN Almost Blank Subframe |
| MDT | Minimization of Drive Tests |
| MIB | Master Information Block |
| MME | Mobility Management Entity |
| MPR | Maximum Power Reduction |
| MSC | Mobile Switching Center |
| NPDCCH | Narrowband Physical Downlink Control Channel |
| NR | New Radio |
| OCNG | OFDMA Channel Noise Generator |
| OFDM | Orthogonal Frequency Division Multiplexing |
| OFDMA | Orthogonal Frequency Division Multiple Access |
| OSS | Operations Support System |
| OTDOA | Observed Time Difference of Arrival |
| O&M | Operation and Maintenance |
| PBCH | Physical Broadcast Channel |
| P-CCPCH | Primary Common Control Physical Channel |
| PCell | Primary Cell |
| PCFICH | Physical Control Format Indicator Channel |
| PDCCH | Physical Downlink Control Channel |
| PDP | Profile Delay Profile |

-continued

| Abbreviation | Explanation |
| --- | --- |
| PDSCH | Physical Downlink Shared Channel |
| PGW | Packet Gateway |
| PHICH | Physical Hybrid-ARQ Indicator Channel |
| PLMN | Public Land Mobile Network |
| PMI | Precoder Matrix Indicator |
| PRACH | Physical Random Access Channel |
| PRS | Positioning Reference Signal |
| PSCCH | Physical Sidelink Control Channel |
| PSD | Power Spectrum Density |
| PSS | Primary Synchronization Signal |
| PSSCH | Physical Sidelink Shared Channel |
| PUCCH | Physical Uplink Control Channel |
| PUSCH | Physical Uplink Shared Channel |
| PVS | Precoding Vector Switching |
| RACH | Random Access Channel |
| QAM | Quadrature Amplitude Modulation |
| RAN | Radio Access Network |
| RAT | Radio Access Technology |
| RLM | Radio Link Management |
| RNC | Radio Network Controller |
| RNTI | Radio Network Temporary Identifier |
| RRC | Radio Resource Control |
| RRM | Radio Resource Management |
| RS | Reference Signal |
| RSCP | Received Signal Code Power |
| RSRP | Reference Symbol Received Power OR Reference Signal Received Power |
| RSRQ | Reference Signal Received Quality OR Reference Symbol Received Quality |
| RSSI | Received Signal Strength Indicator |
| RSTD | Reference Signal Time Difference |
| SCH | Synchronization Channel |
| SCell | Secondary Cell |
| SDU | Service Data Unit |
| SFN | System Frame Number |
| SGW | Serving Gateway |
| SI | System Information |
| SIB | System Information Block |
| SNR | Signal to Noise Ratio |
| SON | Self Optimized Network |
| SS | Synchronization Signal |
| SSS | Secondary Synchronization Signal |
| TDD | Time Division Duplex |
| TDOA | Time Difference of Arrival |
| TOA | Time of Arrival |
| TSS | Tertiary Synchronization Signal |
| TTI | Transmission Time Interval |
| TxD | Transmit Diversity |
| UE | User Equipment |
| UL | Uplink |
| UMTS | Universal Mobile Telecommunication System |
| USIM | Universal Subscriber Identity Module |
| UTDOA | Uplink Time Difference of Arrival |
| UTRA | Universal Terrestrial Radio Access |
| UTRAN | Universal Terrestrial Radio Access Network |
| WCDMA | Wide CDMA |
| WLAN | Wide Local Area Network |

The invention claimed is:

1. A method performed by a transmitting device for precoding one or more signals to be wirelessly transmitted to a receiving device, the transmitting device and the receiving device both using multiple antennas for implementing antenna diversity, the method comprising:

applying a coding scheme to data portions and to reference signal portions of the one or more signals to generate one or more coded signals, wherein the coding scheme applied to the data portions is the same as the coding scheme applied to the reference signal portions and wherein the coding scheme maps different reference signal portions or their conjugates to adjacent subcarriers or to adjacent symbols to be transmitted by different antennas of the multiple transmit antennas; and transmitting the one or more coded signals to the receiving device using multiple transmit antennas of the transmitting device.

2. A transmitting device configured to precode one or more signals to be wirelessly transmitted to a receiving device, the transmitting device and the receiving device both configured to use multiple antennas for implementing antenna diversity, the transmitting device comprising:

one or more processing circuits configured to apply a coding scheme to data portions and to reference signal portions of one or more signals to generate one or more coded signals, wherein the coding scheme applied to the data portions is the same as the coding scheme applied to the reference signal portions and wherein the coding scheme maps different reference signal portions or their conjugates to adjacent subcarriers or to adjacent symbols to be transmitted by different antennas of the multiple transmit antennas;

multiple transmit antennas; and communication circuitry configured to transmit the one or more coded signals to the receiving device using the multiple transmit antennas.

3. The transmitting device of claim 2, wherein the coding scheme maps different reference signal portions or their conjugates to adjacent subcarriers to be transmitted by different antennas of the multiple transmit antennas and comprises a Space-Frequency Block Coding, SFBC, scheme.

4. The transmitting device of claim 2 wherein the coding scheme maps different reference signal portions or their conjugates to adjacent symbols to be transmitted by different antennas of the multiple transmit antennas and comprises a Space-Time Block Coding, STBC, scheme.

5. The transmitting device of claim 2, wherein the coding scheme maps different reference signal portions or their conjugates to adjacent resource elements on a time-frequency resource grid to be utilized in transmission of the one or more signals using the multiple transmit antennas.

6. The transmitting device of claim 2, wherein the coding scheme comprises a higher-order diversity coding scheme comprising a first coding scheme for three or more of the multiple transmit antennas and a second coding scheme for the three or more of the multiple transmit antennas.

7. The transmitting device of claim 6, wherein the first and second coding schemes comprise:

a Space-Time Block Coding, STBC, scheme; and/or
a Space-Frequency Block Coding, SFBC, scheme; and/or
a frequency-switched transmit diversity scheme; and/or
a beamforming scheme; and/or
a spatial multiplexing scheme.

8. The transmitting device of claim 2, wherein the transmitting device comprises a network node.

9. The transmitting device of claim 2, wherein the transmitting device comprises a user equipment.

10. A method performed by a receiving device for processing one or more signals received via multiple receive antennas from multiple transmit antennas used by a transmitting device, the method comprising:

estimating a covariance matrix associated with decoding the received one or more signals, wherein the estimating is based on an assumption that: a coding scheme applied by the transmitting device to data portions of the one or more signals is the same as the coding scheme applied by the transmitting device to reference signal portions of the one or more signals and the coding scheme maps different reference signal portions or their conjugates to adjacent subcarriers or to adjacent symbols transmitted by different antennas of the multiple transmit antennas; and decoding the received one or more signals using the estimated covariance matrix.

11. A receiving device configured to process one or more signals, the receiving device comprising:

multiple receive antennas;

communication circuitry configured to receive, via the multiple receive antennas, one or more signals transmitted by a transmitting device via multiple transmit antennas;

one or more processing circuits configured to:

estimate a covariance matrix associated with decoding the received one or more signals, wherein the estimation of the covariance matrix is based on an assumption that a coding scheme applied by the transmitting device to data portions of the one or more signals is the same as the coding scheme applied by the transmitting device to reference signal portions of the one or more signals and the coding scheme maps different reference signal portions or their conjugates to adjacent subcarriers or to adjacent symbols transmitted by different antennas of the multiple transmit antennas; and decode the one or more signals using the estimated covariance matrix.

12. The receiving device of claim 11, wherein the receiving device comprises a reference signal minimum mean square error, MMSE, Interference Rejection Combining, IRC, receiver.

13. The receiving device of claim 11, wherein the one or more processing circuits are configured to decode the one or more signals by:

determining a channel estimate based on the reference signal portions of the received one or more signals; and decoding the data portions of the received one or more signals using the channel estimate and the estimated covariance matrix.

14. The receiving device of claim 13, wherein the one or more processing circuits are further configured to estimate a channel between each of the multiple transmit antennas and each of the multiple receive antennas using the reference signal portions of the received one or more signals.

15. The receiving device of claim 11, wherein the one or more processing circuits are configured to estimate the covariance matrix based on the assumption the coding scheme applied by the transmitting device to both the data portions and the reference signal portions of the received one or more signals comprises a Space-Frequency Block Coding, SFBC, scheme.

16. The receiving device of claim 11, wherein the one or more processing circuits are configured to estimate the covariance matrix based on the assumption the coding scheme applied by the transmitting device to both the data portions and the reference signal portions of the received one or more signals comprises a Space-Time Block Coding, STBC, scheme.

17. The receiving device of claim 11, wherein the receiving device comprises a network node.

18. The receiving device of claim 11, wherein the receiving device comprises a user equipment.

* * * * *